US011785279B2

(12) United States Patent
Rogers et al.

(10) Patent No.: US 11,785,279 B2
(45) Date of Patent: Oct. 10, 2023

(54) SYNCHRONIZED VIDEO VIEWING USING A LOGICAL CLOCK

(71) Applicant: Dropbox, Inc., San Francisco, CA (US)

(72) Inventors: Alan Rogers, Brunswick (AU); Siya Yang, Bellevue, WA (US); Daniel Wagner, New York, NY (US); Dylan Nelson, Brooklyn, NY (US); Jason Stakelon, Sausalito, CA (US)

(73) Assignee: Dropbox, Inc., San Francisco, CA (US)

( * ) Notice: Subject to any disclaimer, the term of this patent is extended or adjusted under 35 U.S.C. 154(b) by 0 days.

(21) Appl. No.: 17/685,452

(22) Filed: Mar. 3, 2022

(65) Prior Publication Data
US 2023/0283831 A1 Sep. 7, 2023

(51) Int. Cl.
*H04N 21/43* (2011.01)
*H04N 21/472* (2011.01)

(52) U.S. Cl.
CPC . *H04N 21/43076* (2020.08); *H04N 21/47217* (2013.01)

(58) Field of Classification Search
CPC ................. H04N 21/43076; H04N 21/47217
See application file for complete search history.

(56) References Cited

U.S. PATENT DOCUMENTS

| 7,219,127 | B2 | 5/2007 | Huck et al. |
| 8,595,342 | B2 | 11/2013 | Igelman et al. |
| 8,688,851 | B2 | 4/2014 | Shin et al. |
| 8,918,541 | B2 | 12/2014 | Morrison et al. |
| 9,210,204 | B2 | 12/2015 | Crowe et al. |
| 10,333,999 | B2 | 6/2019 | Shamma |
| 10,536,741 | B1 | 1/2020 | Madison et al. |
| 10,614,857 | B2 | 4/2020 | Wasada et al. |
| 2010/0083324 | A1 | 4/2010 | Smith et al. |
| 2010/0153577 | A1* | 6/2010 | Wohlert ................. H04L 65/80 709/231 |
| 2018/0286458 | A1 | 10/2018 | Harron et al. |
| 2022/0070524 | A1* | 3/2022 | Iyer ................. H04N 21/43076 |

OTHER PUBLICATIONS

Pan J.S., et al., "Real-Time Collaborative Video Watching on Mobile Devices with REST Services," 2012 Third FTRA International Conference on Mobile, Ubiquitous, and Intelligent Computing, doi: 10.1109/MUSIC.2012.13, pp. 29-34.

* cited by examiner

*Primary Examiner* — Nicholas T Corbo
(74) *Attorney, Agent, or Firm* — Polsinelli PC

(57) ABSTRACT

The present technology pertains to synchronized video viewing that is supported by the use of a pending changes count to keep the client devices in synchronization while providing a user experience that matches the expectations of the user. A second client device can receive input to change some aspect of the playback of a video that is being viewed synchronously with at least one other device. The second client device can process the event so the video can reflect the received input. The second client device can also send a collaboration message to a synchronized video viewing service to inform other client devices of the command. Since the second client device is aware of its own event, the second client device can ignore processing any other collaboration messages until it receives the collaboration message it initiated echoed back to it. Thereafter it can resume processing received collaboration messages.

20 Claims, 15 Drawing Sheets

SYNCHRONIZED VIDEO VIEWING USING A LOGICAL CLOCK

The present technology pertains to synchronized video viewing whereby two or more client devices can contemporaneously view a video in synchronization, and more specifically the present technology pertains to synchronized video viewing that is supported using a logical clock to keep the client devices in synchronization while providing a user experience matching the expectations of users of the client devices.

BACKGROUND

As teams have become be more geographically distributed or some members have transitioned to working from home, technology has generally supported this transition with various tools that improve communication and commenting on documents, or that bring people together through video conferencing. But such tools are not sufficient to support live, synchronized video viewing by remote participants. While a video or other file can be shared during a video conference, there often is not enough bandwidth to provide high-quality playback of the video.

DETAILED DESCRIPTION

Figure 1:
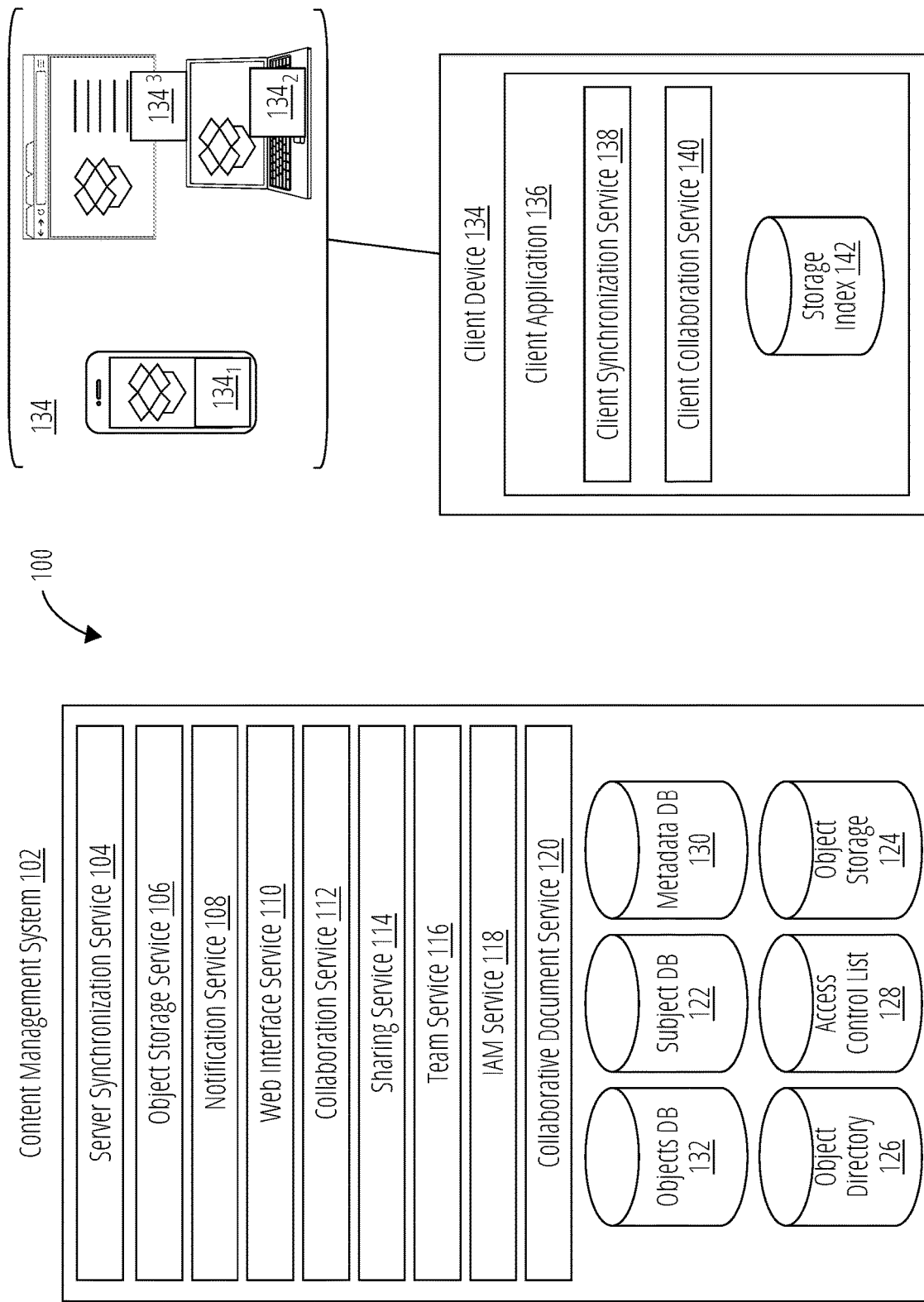
FIG. 1 illustrates an example of a content management system and client devices in accordance with some aspects of the present technology.

The present technology pertains to synchronized video viewing whereby two or more client devices that are remote from each other can contemporaneously view a video in synchronization.

However, supporting synchronized video viewing is a difficult task in general because it is difficult to account for discrepancies in network connections and for client device capabilities and configurations. And when multiple users can manipulate playback controls for the video at approximately the same time, synchronized video viewing is even more difficult because two different users might manipulate playback controls at approximately the same time.

When two client devices manipulate playback controls for the video at approximately the same time, one possible experience will result in each client device sending information about a local command to the other device. When this happens, each client device adopts the other client device's state but loses its own. For example, if User 1 pauses the content at frame 100 just before User 2 jumps to a frame 200, the client device of User 2 would jump to frame 200 and then receive the information about the pause command at frame 100 from the client device of User 1, causing the client device of User 2 to pause the video and jump back to frame 100. Meanwhile, the opposite would happen for the client device of User 1. The client device of User 1 would pause at frame 100 and then receive the information about the jump to frame 200 from the client device of User 2, causing the client device of User 1 to jump to frame 200 and begin playing. The two devices would no longer be in sync.

When two client devices manipulate playback controls for the video at approximately the same time, another possible experience would result in at least one client device implementing a local command, then performing a command initiated by a remote device, and then re-implementing the original local command. For example, if User 1 pauses the content at frame 100 just before User 2 jumps to frame 200, User 2 might first experience a jump to frame 200 where the video continues playing, then a pause and jump back to frame 100, then a jump back to the frame 200. Although User 2 ends up at the intended portion of the video, the user experience is poor. This experience would occur (if not for the present technology) because the client device for User 2 would first process the local input to jump to frame 200 prior to receiving a synchronization command to pause at frame 100. The client device for User 2 would process the command to pause at frame 100, and then User 2 would receive a synchronization command (resulting from their own command) to jump to frame 200, which upon processing thereof, would cause the client device to return to the intended portion of the video.

The present technology addresses the above-described challenges in synchronized video viewing using a system that foregoes perfect synchronization of the video at the various client devices for the benefit of an improved user experience where any discrepancy in synchronization is both transitory and not easy for a user to perceive. More specifically, the present technology pertains to synchronized video viewing supported by the use of a logical clock to keep the client devices in synchronization while providing a user experience matching the expectations of the users of the client devices.

A logical clock is used to allow client devices to identify messages that pertain to actions that happened before some event. In the case of the present technology, a second client device can receive input to change some aspect of the playback of a video or other content that is being viewed synchronously with at least one other device. Upon receiving this input, the second client device can process the event so the video or other content can reflect the received input. The second client device can also send a collaboration message to the first client device(s) to inform them of the command. The sending of the collaboration message is what facilitates the server to establish a strict happened-before relationship. Since the second client device is aware of this event and that the server establishes the strict happened-before relationship, it can ignore processing any other collaboration messages until it receives the collaboration message it initiated echoed back to it. Thereafter it can resume processing received collaboration messages. This process will result in the first client device and the second client device achieving synchronization while also providing a good user experience.

In the example of user 1 pausing the content just before user 2 jumps to a future frame, the device of user 2 would process the jump to the future frame and continue playing. Meanwhile, the device of user 2 would receive a synchronization instruction to pause the content, but the client device of user 2 would ignore this message because it had happened before user 2 jumped to the future frame. Once the client device of user 2 receives its own synchronization instruction echoed back to it, the client device of user 2 will know that any additional synchronization instructions need to be processed to stay in sync. In terms of keeping the client device of user 1 and the client device of user 2 in sync, the present technology has allowed the devices to be strategically out of sync for a short period. The client device of user 1 processed a pause command and then jumped to a future frame to return to a synced state with the client device of user 2, whereas the client device of user 2 ignored the pause instruction in favor of its later issued command. Importantly, both user 1 and user 2 experience a viewing experience that is intuitive and considered a good user experience.

While the present disclosure uses an example of synchronized video viewing to explain the present technology, the technology for the synchronized video viewing can also be used for any media including a synchronized audio experience, synchronized playlist experience, synchronized mixed media, synchronized viewing of image(s), document(s), and slide show(s).

In some embodiments, the disclosed technology is deployed in the context of a content management system having object synchronization capabilities and collaboration features, among others. An example system 100 configuration is shown in FIG. 1, which depicts content management system 102 interacting with client device 134.

Accounts

Content management system 102 can store objects in association with accounts, as well as perform a variety of object management tasks, such as retrieve, modify, browse, and/or share the object(s). Furthermore, content management system 102 can enable an account to access object(s) from multiple client devices.

Content management system 102 supports a plurality of accounts. A subject (user, group, team, company, etc.) can create an account with content management system, and account details can be stored in subject database 122. Subject database 122 can identify a registered subject by a subject ID, and store profile information for registered subjects in association with the subject ID. In some cases, profile information for registered subjects includes a subject name and/or email address. Subject database 122 can include account management information, such as account type (e.g. various tiers of free or paid accounts), storage space allocated, storage space used, client devices 134 having a registered content management client application 136 resident thereon, security settings, personal configuration settings, etc. In some embodiments, some information associated with an account may not be directly stored, and rather this information can be derived. For example, storage space used might be explicitly stored, or it can be calculated when needed.

In some embodiments, subject database 122 need not store complete information associated with an account for a subject. Some portion of information associated with an account for a subject can also be stored in another database of content management system 102 such as metadata database 130, or in a database external to content management system 102.

Subject database 122 can store groups of accounts associated with a subject. Groups can have permissions based on group permissions statements and/or access control lists, and members of the groups can inherit the permissions. For example, a marketing group can have access to one set of objects while an engineering group can have access to another set of objects. An administrator group can modify groups, modify subject accounts, etc. Groups are also subjects identified by subject ID.

In some embodiments, subject database 122 can be broken into a plurality of tables, indexes and other data structures.

Object Storage

A feature of content management system 102 is the storage of objects, which can be stored in object storage 124. An object generally is any entity that can be recorded in a file system. Objects can be any object including digital data such as documents, collaboration objects, text files, audio files, image files, video files, webpages, executable files, binary files, object directories, folders, zip files, playlists, albums, symlinks, cloud docs, mounts, placeholder objects referencing other objects in content management system 102 or in other content management systems, etc.

In some embodiments, objects can be grouped into a collection, which can refer to a folder including a plurality of objects, or a plurality of objects that are related or grouped by a common attribute.

In some embodiments, object storage 124 is combined with other types of storage or databases to handle specific functions. Object storage 124 can store objects, while metadata regarding the objects can be stored in metadata database 130. Likewise, data regarding where an object is stored in object storage 124 can be stored in object directory 126. Additionally, data regarding changes, access, etc. can be stored in objects database 132. Objects database 132 can also include a subject account identifier that identifies the subject IDs that have access to the object.

In some embodiments, objects database 132 can be broken into a plurality of tables, indexes and other data structures.

Each of the various storages/databases such as object storage 124, object directory 126, objects database 132, and metadata database 130 can be comprised of more than one such storage or database and can be distributed over many devices and locations. Other configurations are also possible. For example, data from object storage 124, object directory 126, objects database 132, and/or metadata database 130 may be combined into one or more object storages or databases or further segmented into additional object storages or databases. Thus, content management system 102 may include more or less storages and/or databases than shown in FIG. 1.

In some embodiments, object storage 124 is associated with at least one object storage service 106, which includes software or other processor executable instructions for managing the storage of objects including, but not limited to, receiving objects for storage, preparing objects for storage, selecting a storage location for the object, retrieving objects from storage, etc. In some embodiments, object storage service 106 can divide an object into smaller chunks for storage at object storage 124. The location of each chunk making up an object can be recorded in object directory 126. Object directory 126 can include a content entry for each object stored in object storage 124. The content entry can be associated with an object ID, which uniquely identifies an object.

In some embodiments, each object and each chunk of an object can also be identified from a deterministic hash function. This method of identifying an object and chunks of objects can ensure that object duplicates are recognized as such since the deterministic hash function will output the same hash for every copy of the same object, but will output a different hash for a different object. Using this methodology, object storage service 106 can output a unique hash for each different version of an object.

Object storage service 106 can also designate or record a parent of an object or a content path for an object in objects database 132. The content path can include the name of the object and/or folder hierarchy associated with the object. For example, the content path can include a folder or path of folders in which the object is stored in a local file system on a client device. In some embodiments, object database might only store a direct ancestor or direct child of any object, which allows a full path for an object to be derived, and can be more efficient than storing the whole path for an object.

While objects are stored in object storage 124 in blocks and may not be stored under a tree like directory structure, such directory structure is a comfortable navigation structure for subjects viewing objects. Object storage service 106 can define or record a content path for an object wherein the "root" node of a directory structure can be any directory with specific access privileges assigned to it, as opposed to a directory that inherits access privileges from another directory.

In some embodiments a root directory can be mounted underneath another root directory to give the appearance of a single directory structure. This can occur when an account has access to a plurality of root directories. As addressed above, the directory structure is merely a comfortable navigation structure for subjects viewing objects, but does not correlate to storage locations of objects in object storage 124.

While the directory structure in which an account views objects does not correlate to storage locations of the objects at content management system 102, the directory structure can correlate to storage locations of the objects on client device 134 depending on the file system used by client device 134.

As addressed above, a content entry in object directory 126 can also include the location of each chunk making up an object. More specifically, the content entry can include content pointers that identify the location in object storage 124 of the chunks that make up the object.

Object storage service 106 can decrease the amount of storage space required by identifying duplicate objects or duplicate blocks that make up an object or versions of an object. Instead of storing multiple copies, object storage 124 can store a single copy of the object or block of the object, and object directory 126 can include a pointer or other mechanism to link the duplicates to the single copy.

Object storage service 106 can also store metadata describing objects, object types, folders, file path, and/or the relationship of objects to various accounts, collections, or groups in metadata database 130, in association with the object ID of the object.

Object storage service 106 can also store a log of data regarding changes, access, etc. in objects database 132. Objects database 132 can include the object ID of the object and can optionally include a description of the change or access action along with a time stamp or version number and any other relevant data. Objects database 132 can also include pointers to blocks affected by the change or object access. Object storage service 106 can also provide the ability to undo operations, by using an object version control mechanism that tracks changes to objects, different versions of objects (including diverging version trees), and a change history that can be acquired from objects database 132.

Object Synchronization

Another feature of content management system 102 is synchronization of objects with at least one client device 134. Client device(s) 134 can take different forms and have different capabilities. For example, client device 134 can be a computing device having a local file system accessible by multiple applications resident thereon. Client device 134 can be a computing device wherein objects are only accessible to a specific application or by permission given by the specific application, and the objects are typically stored either in an application specific space or in the cloud. Client device 134 can be any client device accessing content management system 102 via a web browser and accessing objects via a web interface. While example client device 134 is depicted in form factors such as a laptop, mobile device, or web browser, it should be understood that the descriptions thereof are not limited to devices of these example form factors. For example a mobile device might have a local file system accessible by multiple applications resident thereon, or might access content management system 102 via a web browser. As such, the form factor should not be considered limiting when considering client 134's capabilities. One or more functions described herein with respect to client device 134 may or may not be available on every client device depending on the specific capabilities of the device—the file access model being one such capability.

In many embodiments, client devices 134 are associated with an account of content management system 102, but in some embodiments client devices 134 can access content using shared links and do not require an account.

As noted above, some client devices can access content management system 102 using a web browser. However, client devices can also access content management system 102 using client application 136 stored and running on client device 134. Client application 136 can include a client synchronization service 138.

Client synchronization service 138 can be in communication with server synchronization service 104 to synchronize changes to objects between client device 134 and content management system 102.

Client device 134 can synchronize content with content management system 102 via client synchronization service 138. The synchronization can be platform agnostic. That is, content can be synchronized across multiple client devices of varying types, capabilities, operating systems, etc. Client synchronization service 138 can synchronize any changes (e.g., new, deleted, modified, copied, or moved objects) to objects in a designated location of a file system of client device 134.

Objects can be synchronized from client device 134 to content management system 102, and vice versa. In embodiments wherein synchronization is from client device 134 to content management system 102, a subject can manipulate objects directly from the file system of client device 134, while client synchronization service 138 can monitor directory on client device 134 for changes to files within the monitored folders.

When client synchronization service 138 detects a write, move, copy, or delete of content in a directory that it monitors, client synchronization service 138 can synchronize the changes to content management storage service 106. In some embodiments, client synchronization service 138 can perform some functions of content management storage service 106 including functions addressed above such as dividing the object into blocks, hashing the object to generate a unique identifier, etc. Client synchronization service 138 can index content within client storage index 142 and save the result in client storage index 142. Indexing can include storing paths plus the object identifier, and a unique identifier for each object. In some embodiments, client synchronization service 138 learns the object identifier from server synchronization service 104, and learns the unique client identifier from the operating system of client device 134.

Client synchronization service 138 can use storage index 142 to facilitate the synchronization of at least a portion of the objects within client storage with objects associated with a subject account on content management system 102. For example, client synchronization service 138 can compare storage index 142 with content management system 102 and detect differences between content on client storage and content associated with a subject account on content management system 102. Client synchronization service 138 can then attempt to reconcile differences by uploading, downloading, modifying, and deleting content on client storage as appropriate. Object storage service 106 can store the changed or new block for the object and update objects database 132, metadata database 130, object directory 126, object storage 124, subject database 122, etc. as appropriate.

When synchronizing from content management system 102 to client device 134, data regarding a mount, modification, addition, deletion, move of an object recorded in objects database 132 can trigger a notification to be sent to client device 134 using notification service 108. When client device 134 is informed of the change, client device 134 can make a request for changes listed in objects database 132 since the last synchronization point known to the client device. When client device 134 determines that it is out of synchronization with content management system 102, client synchronization service 138 requests object blocks including the changes, and updates its local copy of the changed objects.

In some embodiments, storage index 142 stores tree data structures wherein one tree reflects the latest representation of a directory according to server synchronization service 104, while another tree reflects the latest representation of the directory according to client synchronization service 138. Client synchronization service can work to ensure that the tree structures match by requesting data from server synchronization service 104 or committing changes on client device 134 to content management system 102.

Sometimes client device 134 might not have a network connection available. In this scenario, client synchronization service 138 can monitor the linked collection for object changes and queue those changes for later synchronization to content management system 102 when a network connection is available. Similarly, a subject can manually start, stop, pause, or resume synchronization with content management system 102.

Client synchronization service 138 can synchronize all content associated with a particular subject account on content management system 102. Alternatively, client synchronization service 138 can selectively synchronize some of the objects associated with the particular subject account on content management system 102. Selectively synchronizing only some of the objects can preserve space on client device 134 and save bandwidth.

In some embodiments, client synchronization service 138 selectively stores a portion of the objects associated with the particular subject account and stores placeholder objects in client storage for the remainder portion of the objects. For example, client synchronization service 138 can store a placeholder object that has the same filename, path, extension, metadata, of its respective complete object on content management system 102, but lacking the data of the complete object. The placeholder object can be a few bytes or less in size while the respective complete object might be significantly larger. After client device 134 attempts to access the object, client synchronization service 138 can retrieve the data of the object from content management system 102 and provide the complete object to client device 134. This approach can provide significant space and bandwidth savings while still providing full access to a subject's objects on content management system 102.

While the synchronization embodiments addressed above referred to client device 134 and a server of content management system 102, it should be appreciated by those of ordinary skill in the art that a user account can have any number of client devices 134 all synchronizing objects with content management system 102, such that changes to an object on any one client device 134 can propagate to other client devices 134 through their respective synchronization with content management system 102.

Collaboration Features

Another feature of content management system 102 is to facilitate collaboration between subjects. Collaboration features include object sharing, commenting on objects, co-working on objects in real time, instant messaging, providing presence and "seen" state information regarding objects, etc.

Sharing

Content management system 102 can manage sharing objects via sharing service 114. Sharing an object by providing a link to the object can include making the object accessible from any computing device in network communication with content management system 102. However, in some embodiments a link can be associated with access restrictions enforced by content management system 102 and Identity and Access Management (IAM) service 118. Sharing content can also include linking content using sharing service 114 to share content within content management system 102 with at least one additional subject account (in addition to the original subject account associated with the object) so that each subject account has access to the object. The additional subject account can gain access to the content by accepting the content, which will then be accessible through either web interface service 110 or directly from within the directory structure associated with their account on client device 134. The sharing can be performed in a platform agnostic manner. That is, the content can be shared across multiple client devices 134 of varying type, capabilities, operating systems, etc. The content can also be shared across varying types of subject accounts.

To share an object within content management system 102 sharing service 114 can add associate a subject ID of a team or of one or more subject accounts with a content item in objects database 132 associated with the object, thus granting the added subject account(s) access to the object. Sharing service 114 can also remove subject IDs from being permitted to access a content item in objects database 132 to restrict a subject account's access to the object. Sharing service 114 can record object identifiers, subject identifiers given access to an object, and access levels in objects database 132. For example, in some embodiments, subject identifiers associated with a single content item can specify different permissions for respective subject identifiers with respect to the associated object.

In some embodiments, content management system 102 can include an access control list 128 which includes a description of complete access rights pertaining to a respective object. An access control list for any respective object in content management system can be derived from objects database 132. In some embodiments, it is not desirable to maintain a persistent access control list 128 for a respective object, as an access control list 128 for a respective object can be derived when needed. In some embodiments, objects can inherit access rights from another object such as ancestor objects.

To share objects outside of content management system 102, sharing service 114 can generate a custom network address, such as a uniform resource locator (URL), which allows any web browser to access the object or collection in content management system 102 without any authentication. To accomplish this, sharing service 114 can include content identification data in the generated URL, which can later be used to properly identify and return the requested object. For example, sharing service 114 can include a token identifying an object ID and optionally a subject ID in the generated URL. Upon selection of the URL, the content identification data included in the URL can be transmitted to content management system 102, which can use the received content identification data to identify the appropriate object and return the object.

In addition to generating the URL, sharing service 114 can also be configured to record in objects database 132 that a URL to the object has been created. In some embodiments, an entry into objects database 132 associated with an object can include a URL flag indicating whether a URL to the object has been created. For example, the URL flag can be a Boolean value initially set to 0 or false to indicate that a URL to the object has not been created. Sharing service 114 can change the value of the flag to 1 or true after generating a URL to the object.

In some embodiments, sharing service 114 can associate a set of permissions to a URL for an object. For example, if a subject attempts to access the object via the URL, sharing service 114 can provide a limited set of permissions for the object. Examples of limited permissions include restrictions that the subject cannot download the object, save the object, copy the object, modify the object, etc. In some embodiments, limited permissions include restrictions that only permit an object to be accessed from with a specified domain, i.e., from within a corporate network domain, or by accounts associated with a specified domain, e.g., accounts associated with a company account (e.g., @acme.com).

In some embodiments, sharing service 114 can also be configured to deactivate a generated URL. For example, each entry into objects database 132 can also include a URL active flag indicating whether the content should be returned in response to a request from the generated URL. For example, sharing service 114 can only return an object requested by a generated link if the URL active flag is set to 1 or true. Thus, access to an object for which a URL has been generated can be easily restricted by changing the value of the URL active flag. This allows a subject to restrict access to the shared object without having to move the object or delete the generated URL. Likewise, sharing service 114 can reactivate the URL by again changing the value of the URL active flag to 1 or true. A subject can thus easily restore access to the object without the need to generate a new URL.

In some embodiments, content management system 102 can designate a URL for uploading an object. For example, a first subject with a subject account can request such a URL, provide the URL to a contributing subject and the contributing subject can upload an object to the first subject's subject account using the URL.

Team Service

In some embodiments content management system 102 includes team service 116. Team service 116 can provide functionality for creating and managing defined teams of subject accounts. Teams can be created for a company, with sub-teams (e.g., business units, or project teams, etc.), and subject accounts assigned to teams and sub-teams, or teams can be created for any defined group of subject accounts. Team service 116 can provide a common shared space for the team, private subject account folders, and access limited shared folders. Team service 116 can also provide a management interface for an administrator to manage collections and objects within team, and can manage subject accounts that are associated with the team. Teams, sub-teams, subject accounts are all given a subject identifier in subject database 122, and the membership to teams by subject accounts is also recorded in subject database 122.

IAM (Identity and Access Management) Service

In some embodiments, content management system 102 includes IAM service 118. IAM service 118 can authenticate a subject account. For subject accounts with multiple levels of rights (e.g. a subject account with subject rights and administrator rights) IAM service 118 can also facilitate explicit privilege escalation to avoid unintentional actions by administrators.

Object Access

Object storage service 106 can receive a token from client application 136 that follows a request to access an object and can return the capabilities permitted to the subject account.

Presence and Seen State

In some embodiments, content management system can provide information about how subjects with which an object is shared are interacting or have interacted with the object. In some embodiments, content management system 102 can report that a subject with which an object is shared is currently viewing the object. For example, client collaboration service 140 can notify notification service 108 when client device 134 is accessing the object. Notifications service 108 can then notify all client devices of other subjects having access to the same object of the presence of the subject of client device 134 with respect to the object.

In some embodiments, content management system 102 can report a history of subject interaction with a shared object. Collaboration service 112 can query data sources such as metadata database 130 and objects database 132 to determine that a subject has saved the object, that a subject has yet to view the object, etc., and disseminate this status information using notification service 108 to other subjects so that they can know who currently is or has viewed or modified the object.

Collaboration service 112 can facilitate comments associated with content, even if an object does not natively support commenting functionality. Such comments can be stored in metadata database 130.

Collaboration service 112 can originate and transmit notifications for subjects. For example, a subject can mention another subject in a comment and collaboration service 112 can send a notification to that subject letting them know that they have been mentioned in the comment. Various other object events can trigger notifications, including deleting an object, sharing an object, etc.

Collaboration service 112 can also provide a messaging platform whereby subjects can send and receive instant messages, voice calls, emails, etc.

Collaboration Objects

In some embodiments content management service can also include collaborative document service 120 which can provide an interactive object collaboration platform whereby subjects can simultaneously create collaboration objects, comment in the collaboration objects, and manage tasks within the collaboration objects. Collaboration objects can be files that subjects can create and edit using a collaboration object editor, and can contain collaboration object elements. Collaboration object elements may include a collaboration object identifier, one or more author identifiers, collaboration object text, collaboration object attributes, interaction information, comments, sharing subjects, etc. Collaboration object elements can be stored as database entities, which allows for searching and retrieving the collaboration objects. Multiple subjects may access, view, edit, and collaborate on collaboration objects at the same time or at different times. In some embodiments this can be managed by requiring two subjects access an object through a web interface and there they can work on the same copy of the object at the same time.

Collaboration Companion Interface

In some embodiments client collaboration service 140 can provide a native application companion interface for the purpose of displaying information relevant to an object being presented on client device 134. In embodiments wherein an object is accessed by a native application stored and executed on client device 134, where the object is in a designated location of the file system of client device 134 such that the object is managed by client application 136, the native application may not provide any native way to display the above addressed collaboration data. In such embodiments, client collaboration service 140 can detect that a subject has opened an object, and can provide an overlay with additional information for the object, such as collaboration data. For example, the additional information can include comments for the object, status of the object, activity of other subjects previously or currently viewing the object. Such an overlay can warn a subject that changes might be lost because another subject is currently editing the object.

In some embodiments, one or more of the services or storages/databases discussed above can be accessed using public or private application programming interfaces.

Certain software applications can access object storage 124 via an application programming interface (API) on behalf of a subject. For example, a software package such as an application running on client device 134, can programmatically make API calls directly to content management system 102 when a subject provides authentication credentials, to read, write, create, delete, share, or otherwise manipulate content.

A subject can view or manipulate content stored in a subject account via a web interface generated and served by web interface service 110. For example, the subject can navigate in a web browser to a web address provided by content management system 102. Changes or updates to content in the object storage 124 made through the web interface, such as uploading a new version of an object, can be propagated back to other client devices associated with the subject's account. For example, multiple client devices, each with their own client software, can be associated with a single account and objects in the account can be synchronized between each of the multiple client devices.

Client device 134 can connect to content management system 102 on behalf of a subject. A subject can directly interact with client device 134, for example when client device 134 is a desktop or laptop computer, phone, television, internet-of-things device, etc. Alternatively or additionally, client device 134 can act on behalf of the subject without the subject having physical access to client device 134, for example when client device 134 is a server.

Some features of client device 134 are enabled by an application installed on client device 134. In some embodiments, the application can include a content management system specific component. For example, the content management system specific component can be a stand-alone client application 136, one or more application plug-ins, and/or a browser extension. However, the subject can also interact with content management system 102 via a third-party application, such as a web browser, that resides on client device 134 and is configured to communicate with content management system 102. In various implementations, the client application 136 can present a subject interface (UI) for a subject to interact with content management system 102. For example, the subject can interact with the content management system 102 via a file system explorer integrated with the file system or via a webpage displayed using a web browser application.

In some embodiments, client application 136 can be configured to manage and synchronize content for more than one account of content management system 102. In such embodiments client application 136 can remain logged into multiple accounts and provide normal services for the multiple accounts. In some embodiments, each account can appear as folder in a file system, and all objects within that folder can be synchronized with content management system 102. In some embodiments, client application 136 can include a selector to choose one of the multiple accounts to be the primary account or default account.

Third Party Services

In some embodiments content management system 102 can include functionality to interface with one or more third party services such as workspace services, email services, task services, etc. In such embodiments, content management system 102 can be provided with login credentials for a subject account at the third party service to interact with the third party service to bring functionality or data from those third party services into various subject interfaces provided by content management system 102.

While content management system 102 is presented with specific components, it should be understood by one skilled in the art, that the architectural configuration of system 100 is simply one possible configuration and that other configurations with more or fewer components are possible. Further, a service can have more or less functionality, even including functionality described as being with another service. Moreover, features described herein with respect to an embodiment can be combined with features described with respect to another embodiment.

While system 100 is presented with specific components, it should be understood by one skilled in the art, that the architectural configuration of system 100 is simply one possible configuration and that other configurations with more or fewer components are possible.

Figure 2:
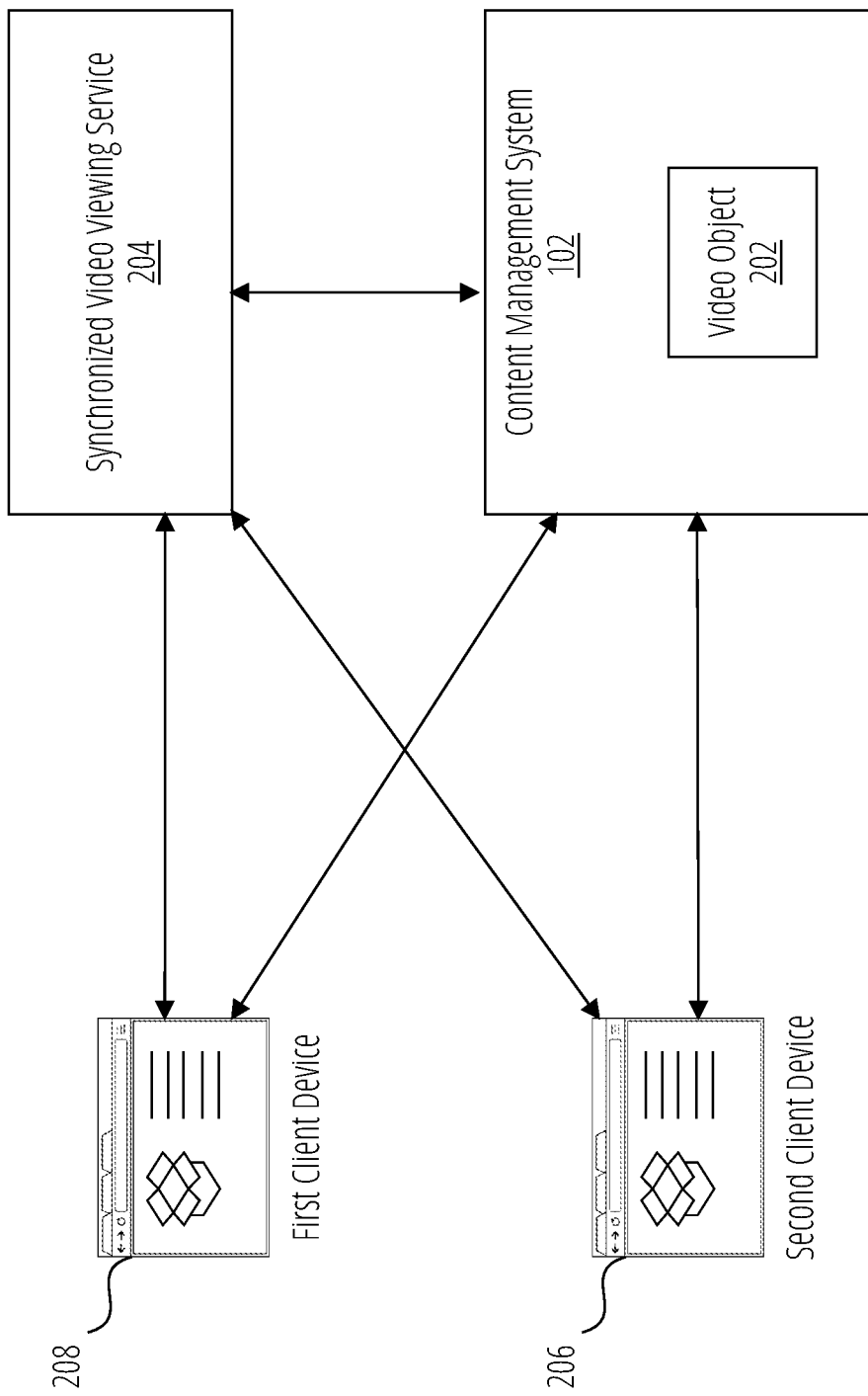
FIG. 2 illustrates an example system for synchronized video viewing in accordance with some aspects of the present technology.

FIG. 2 illustrates an example system for synchronized video viewing in accordance with some aspects of the present technology. For example, second client device 206 and first client device 208 are engaged synchronized video viewing supported by the synchronized video viewing service 204.

In some embodiments, the synchronized video viewing service 204 is configured to provide interfaces for viewing and editing a video and otherwise collaborating with respect to the video. One means of such collaboration can include synchronized video viewing. The synchronized video viewing service 204 can be further configured to provide message handling service to the second client device 206 and first client device 208. For example, the second client device 206 and the first client device 208 can exchange collaboration messages using the synchronized video viewing service 204 as an intermediary to receive and distribute messages. In some embodiments, the synchronized video viewing service 204 can guarantee that messages are processed and distributed in the order in which they were received by the synchronized video viewing service 204.

The second client device 206 and first client device 208 are examples of client devices 134. As referred to herein, the first client device 208 can refer to any number of first client devices 208 or one or more first client devices 208. However, as referred to herein, the second client device 208 refers to an individual client device participating in the synchronized video viewing.

The synchronized video viewing service 204 can be part of content management system 102 or a separate service that uses APIs to interact with the content management system 102. The synchronized video viewing service 204 can also take advantage of selected services from the content management system 102 or incorporate its own version of such services. For example, the synchronized video viewing service 204 might utilize the content management system 102 for storing and streaming the video object 202 that is the subject of the synchronized video viewing, or the synchronized video viewing service 204 can store its own version of the video object 202. In another example, the synchronized video viewing service 204 can utilize the collaboration service 112 of the content management system 102, or the synchronized video viewing service 204 could implement its own collaboration service.

Figure 3:
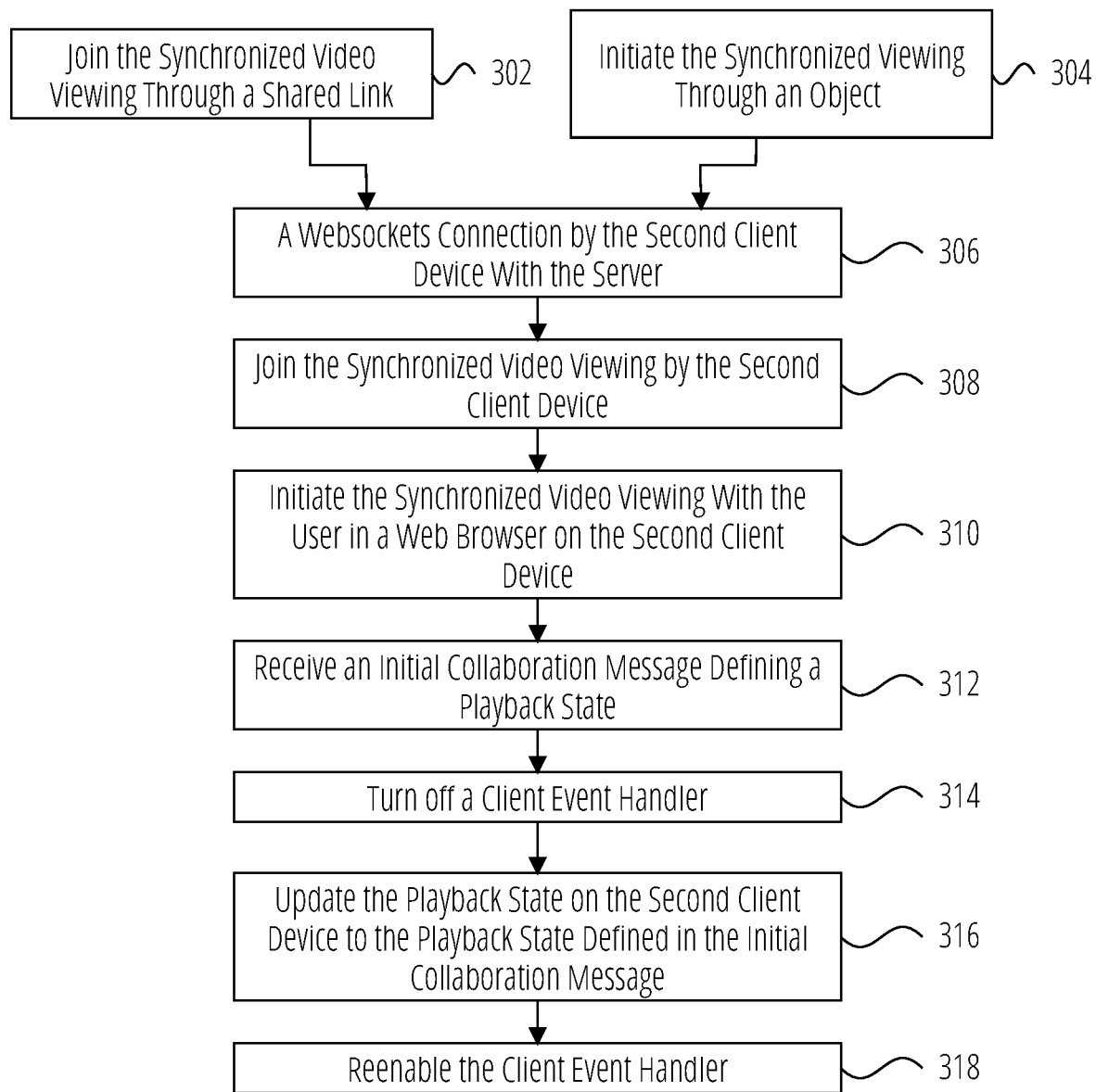
FIG. 3 illustrates an example for initiating a synchronized video viewing session from the point of view of a client device interacting with a synchronized video viewing service in accordance with some aspects of the present technology.

FIG. 3 illustrates an example for initiating a synchronized video viewing session from the point of view of a client device interacting with a synchronized video viewing service. Although the example method depicts a particular sequence of operations, the sequence may be altered without departing from the scope of the present disclosure. For example, some of the operations depicted may be performed in parallel or in a different sequence that does not materially affect the function of the method illustrated in FIG. 3. In other examples, different components of an example device or system that implements the method may perform functions at substantially the same time or in a specific sequence.

In some embodiments, the method illustrated in FIG. 3 begins after the first client device 208 is already viewing a video. In such embodiments, a user operating second client device 206 can join a synchronized video viewing by activating a link (302) inviting the user operating the second client device 206 to join the synchronized video viewing or the user operating the second client device 206 can initiate (304) the synchronized video viewing by interacting with an object.

In some embodiments, the method includes initiating the synchronized video viewing through a shared link at block 302. For example, the first client device 208 may have sent a link to a user of the second client device 206 and potentially other users by instructing the synchronized video viewing service 204 to send the link. The second client device 206 may receive the link from the synchronized video viewing service 204. The second client device 206 may initiate the synchronized video viewing through a shared link when the user operating the second client device 206 operates the second client device 206 to activate the shared link.

In some embodiments, the method includes initiating the synchronized video viewing through an object presented in a file browsing interface at block 304. For example, the second client device 206 may interact with an object representing a video file and initiate the synchronized video viewing through the object. For example, the user could operate the second client device 206 to right-click on the object in the file browser interface to bring up a contextual menu and then to select an option to initiate the synchronized video viewing with another user (such as a user operating the first client device 208) already viewing the object. In some embodiments, it may be possible to identify another user from the presence information the file browser interface receives from collaboration service 112.

In another example of initiating the synchronized viewing through an object at block 304, the method comprises accessing the video object on the second client device using an application on the second client device. For example, the second client device 206 may access the video object using a video player or a web interface on the second client device. In some embodiments, the video player or web interface can be provided by the synchronized video viewing service 204.

While accessing the video object, the second client device 206 can receive an indication from collaboration service 112 that at least one other user is also accessing the video object. For example, the second client device 206 can receive presence information from the collaboration service 112 indicating that another client device, such as the first client device 208, is also accessing the video object. In such an instance, the user of the second client device 206 can operate the second client device 206 to send a request to the user of the first client device 208 to begin synchronized video viewing.

However, when a client device such as the second client device 206 attempts to join into a synchronized video viewing session, the second client device 206 can establish a connection with the synchronized video viewing service 204 at block 306. In some embodiments, the connection is associated with a policy that requires messages to be sent in the order they are received. For example, the second client device 206 may establish a WebSockets connection with the synchronized video viewing service 204 configured to facilitate synchronized video viewing.

WebSockets is a protocol that provides two-way communication between a client device and the synchronized video viewing service 204. One attribute of WebSockets is that the protocol handles messages in the order they are received. In the context of the present technology, WebSockets can be used to echo any collaboration messages pertaining to the state of the video that is the subject of the synchronized video viewing received from any client device to all other client devices taking part in the synchronized video viewing, including the client device that sent the collaboration message.

In some embodiments, the method includes joining the synchronized video viewing by the client device at block 308. For example, the second client device 206 may join the synchronized video viewing by loading or streaming the video object in coordination with the synchronized video viewing service 204.

In some embodiments, the method includes initiating the synchronized video viewing with the user in a web browser on the second client device at block 310. For example, the second client device 206 may initiate the synchronized video viewing by receiving initial state information from the synchronized video viewing service 204 in an initial collaboration message. The synchronized video viewing service 204 can send, and the second client device 206 can receive, an initial collaboration message defining a playback state at block 312. In some embodiments, the video state is information about one of a paused, playing, seeking, or changing the rate of playback state. In some embodiments, a collaboration message, such as the one or more first collaboration messages or the second collaboration message, includes a video frame and video state.

In some embodiments, the client device can join the synchronized video viewing after it has already begun. In such embodiments the server can calculate a current frame and send an initial collaboration message to the client device instructing the client device to jump to the current frame. Alternatively, the server could resend the same initial collaboration message it sent to other client devices already in the synchronized video viewing, and the second client device 206 can calculate a correct client time and corresponding frame for the video player using the frame number and frame rate of the video in the initial collaboration message and the period in which the synchronized video view has already elapsed to determine the correct client time. The correct client time can be used by the second client device 206 to advance the video to a proper frame whereby the second client device becomes caught up with the remote participants already viewing the video.

In some embodiments, prior to advancing the video to a proper frame, the method includes turning off a client event handler, whereby no collaboration messages will result from updating the playback state on the second client device at block 314. This can be necessary because the video player on the second client device 206 can be configured to transmit a collaboration message with a changed video state whenever the second client device 206 changes its local playback state. However, in the instance of the second client device 206 joining the session and attempting to get in sync with the other device, sending such a collaboration message with an updated state might result in a user experience that appears glitchy, or that could result in the player crashing or experiencing a denial of service. Thus, when the second client device 206 receives an updated state from the synchronized video viewing service 204, it can turn off the client event handler that reports the playback state changes back to the synchronized video viewing service 204.

In some embodiments, the method includes updating the playback state on the second client device to the playback state defined in the initial collaboration message at block 316. As addressed above, the second client device 206 can calculate a correct client time and corresponding frame for the video player using the frame number and frame rate of the video in the initial collaboration message and the period in which the synchronized video view has already elapsed to determine the correct client time. The correct client time can be used by the second client device 206 to advance the video to a proper frame whereby the second client device becomes caught up with the remote participants already viewing the video.

Further, if the state is indicated as playing in the initial collaboration message, the second client device 206 can set the correct client time, and play the video, or if the state is paused in the initial collaboration message, the second client device 206 can pause the video.

In some embodiments, the method includes reenabling the client event handler at block 318. For example, the second client device 206 may reenable the client event handler after updating the playback state to reflect the synchronized video viewing. The client event handler is reenabled to report changes made to the playback state on the second client device 206 to the synchronized video viewing service 204.

Figure 4:
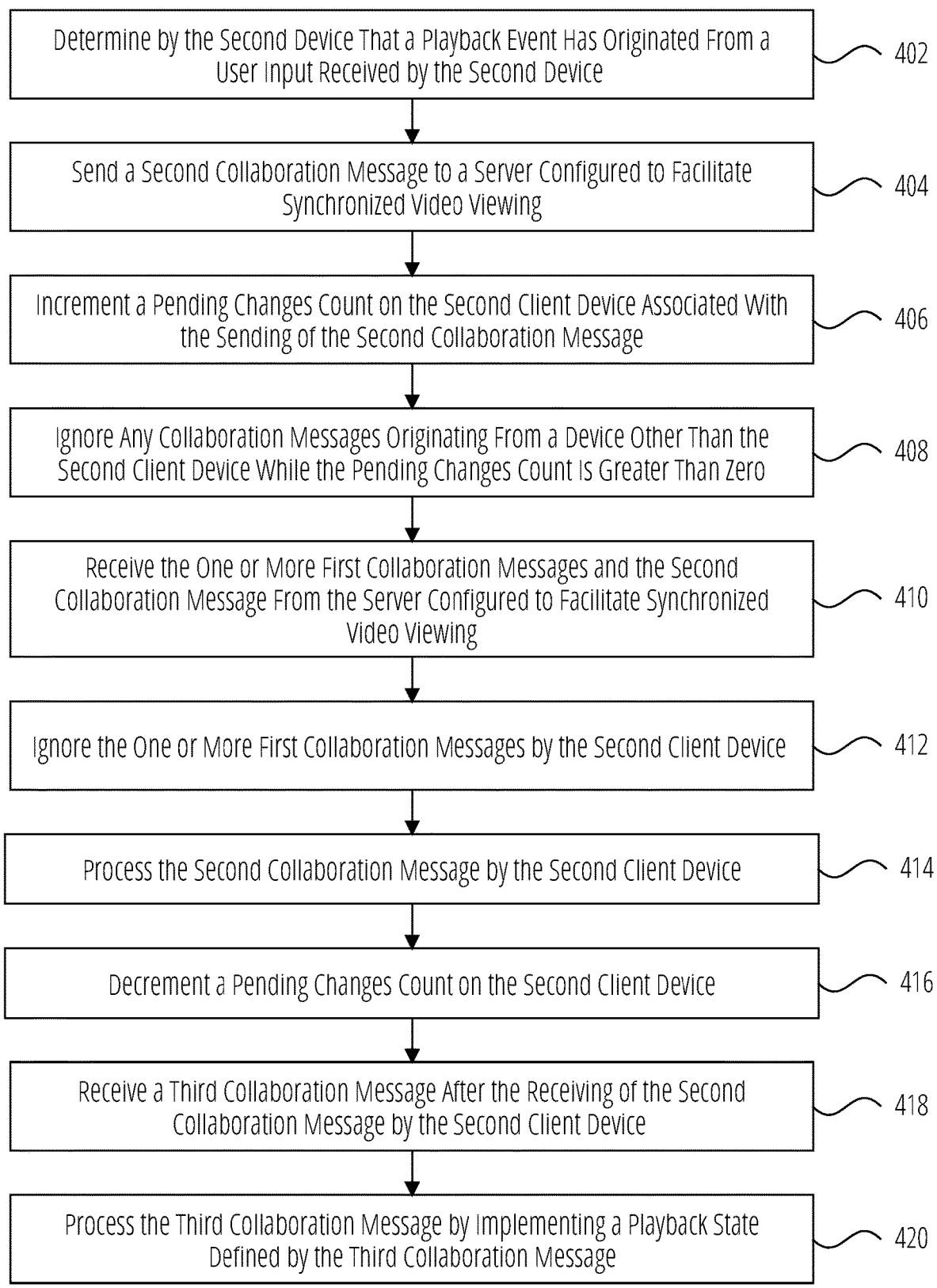
FIG. 4 illustrates an example for sending, receiving, and processing collaboration messages from the point of view of a second client device that receives a collaboration message for an event that has happened before a playback event is received by the second client device in accordance with some aspects of the present technology.

FIG. 4 illustrates an example for sending, receiving, and processing collaboration messages from the point of view of a second client device that receives a collaboration message for an event that has happened before a playback event is received by the second client device. The method illustrated in FIG. 4 may result in a trade-off where immediate synchronization is briefly sacrificed to provide a better user experience. However, any period where synchronization is not maintained is both transitory and not easy for a user to perceive. Although the example method depicts a particular sequence of operations, the sequence may be altered without departing from the scope of the present disclosure. For example, some of the operations depicted may be performed in parallel or in a different sequence that does not materially affect the function of the method illustrated in FIG. 4. In other examples, different components of an example device or system that implements the method may perform functions at substantially the same time or in a specific sequence.

In some embodiments, the method illustrated in FIG. 4 begins by determining that a playback event has originated from a user input received by the second device at block 402. For example, the second client device 206 may determine that a playback event has originated from a user input received by the second device. The user input might be to play or pause a video, jump to a new frame, adjust a playback rate, or initiate forward or reverse scrubbing. After receiving the playback event, the second client device 206 can calculate a frame and a playback rate for the current state of the video, and the second client device 206 can prepare a collaboration message to inform the synchronized video viewing service 204 and other client devices of the playback event received by the second client device 206.

In some embodiments, the method includes sending the collaboration message to a synchronized video viewing service configured to facilitate synchronized video viewing at block 404. For example, the second client device 206 may send the collaboration message including information about the playback event detected at block 402 to the synchronized video viewing service 204.

In some embodiments, the method includes incrementing a pending changes count on the second client device associated with sending the second collaboration message at block 406. For example, the second client device 206 increments a pending changes count on the second client device whenever it sends a collaboration message. In some instances, the second client device can send out several messages and would increment the pending changes count for each message.

In some embodiments, the pending changes count is a logical clock when paired with a reliance on the fact that the client device is receiving all messages in order. The pending changes count is used by the client devices, including the second client device 206, to determine that an event has happened on that client device. Since the client devices can be assured that every collaboration message it sends to the synchronized video viewing service 204 will be echoed back to it, and the synchronized video viewing service 204 will send the collaboration messages in the same order they were received, the client devices can be assured that any collaboration messages they receive prior to receiving a collaboration message that they originated, must pertain to a playback event that happened before the playback event described in the collaboration message is sent. The logical clock keeps track of messages sent by a respective client device. For example, the second client device 206 will increment its logical clock when it sends a message, and it will decrement its logical clock when it receives a collaboration message it originated.

In some embodiments, at block 408, the client devices will ignore any collaboration messages originating from a device other than itself while the pending changes count (e.g., the logical clock) is greater than zero. For example, the second client device 206 may ignore any collaboration messages originating from a device other than the second client device, while its pending changes count is greater than zero. The pending changes count indicates that the second client device 206 has sent its own collaboration message describing a playback event, and any other collaboration message that the second client device 206 receives prior to receiving its own collaboration message echoed back to it must have happened before its own playback event and should be ignored for the sake of providing a good playback experience to the user of the second client device 206.

In some embodiments, the synchronized video viewing service 204 has also received one or more collaboration messages from one or more first client devices 208 participating in the synchronized video viewing with the second client device 206. As addressed above, the synchronized video viewing service 204 maintains a WebSockets connection with the client devices and is configured to echo all collaboration messages to all client devices, including the client device that sent the collaboration message.

In some embodiments, the method includes receiving the one or more first collaboration messages (originating from the one or more first client devices 208) and the second collaboration message from the synchronized video viewing service configured to facilitate synchronized video viewing at block 420. For example, the second client device 206 may receive the one or more first collaboration messages and the second collaboration message from the synchronized video viewing service. In some embodiments, the one or more first collaboration messages and the second collaboration message are received in the order that they were received by the synchronized video viewing service. In some embodiments, the one or more first collaboration messages are ordered prior to the second collaboration message, whereby the one or more first collaboration messages are received by the second client device 206 prior to the second collaboration message.

In some embodiments, the method includes ignoring the one or more first collaboration messages by the second client device at block 412 since the pending changes count is greater than 0 as a result of incrementing the count at block 406. But, the second collaboration message is processed by the second client device at block 414. In this instance, the processing of the second collaboration message is decrementing the pending changes count at block 416 to account for the fact that its own collaboration message has been echoed to the second client device 206. This is an indication to the second client device 206 that all events that happened before the playback event detected by the second client device at block 402 have been sent by the synchronized video viewing service 204 and that any further collaboration messages reflect updated playback states that need to be implemented by the second client device 206 to remain in sync with the synchronized video viewing.

In some embodiments, the method includes receiving a third collaboration message after receiving the second collaboration message by the second client device at block 418. For example, the second client device 206 may receive a third collaboration message after receiving the second collaboration message by the second client device. The third collaboration message can be from any client devices participating in the synchronized video viewing.

In some embodiments, the method includes processing the third collaboration message by implementing a playback state defined by the third collaboration message at block 420. For example, the second client device 206 may process the third collaboration message by implementing a playback state defined by the third collaboration message.

Figure 5:
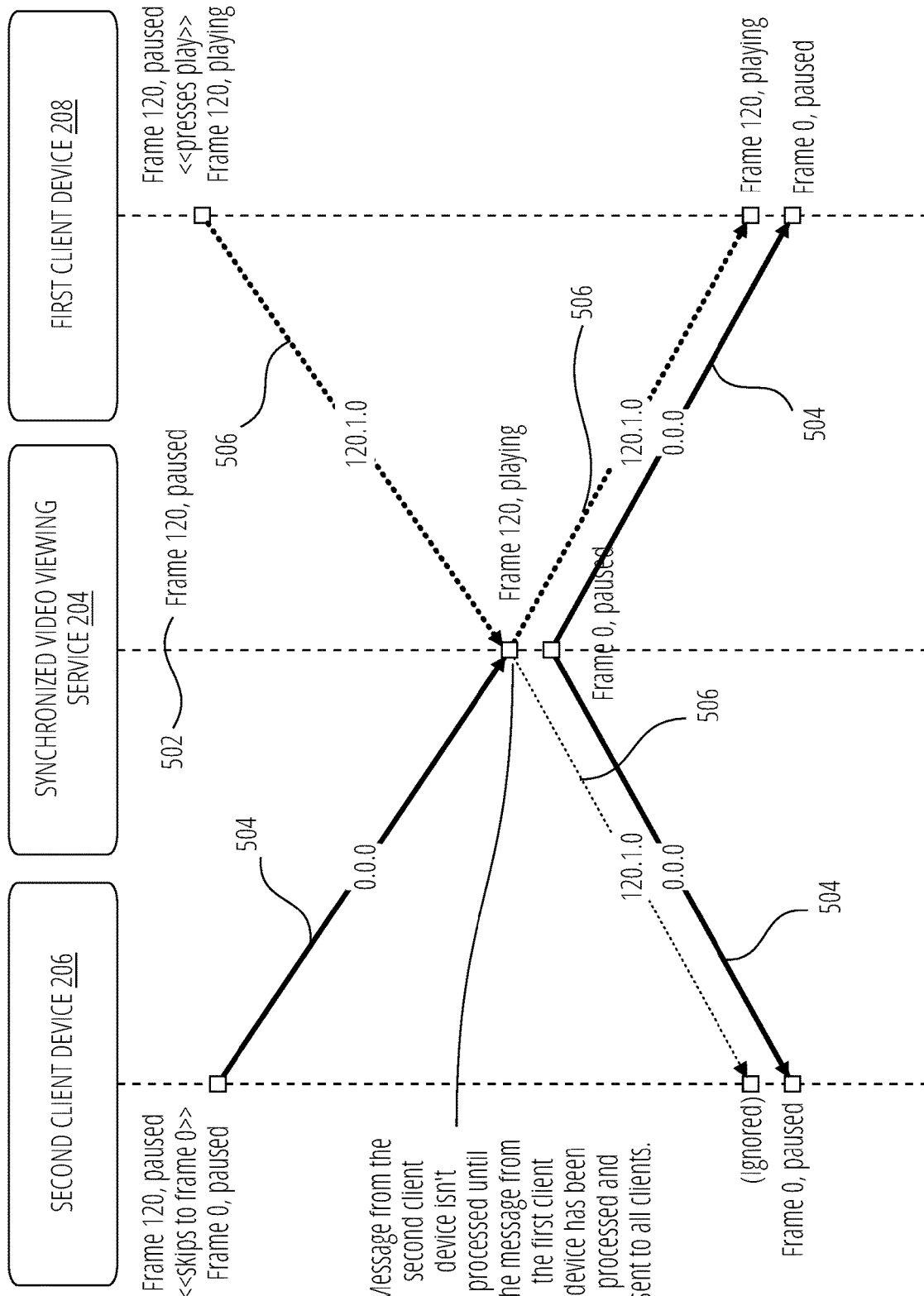
FIG. 5 illustrates a sequence diagram showing collaboration messages sent by the second client device and the first client device and the echoing back of the collaboration messages to the client devices by the synchronized video viewing service in accordance with some aspects of the present technology.

FIG. 5 illustrates a sequence diagram showing collaboration messages sent by the second client device 206 and the first client device 208 and the echoing back of the collaboration messages to the client devices by the synchronized video viewing service 204.

As illustrated in FIG. 5, the video that is part of the synchronized video viewing has an initial playback state 502, where the video is paused at frame 120. The user of the first client device 208 then presses play, and the first client device 208 receives this input to change the playback state to playing at frame 120 and sends a collaboration message 506 describing the state to the synchronized video viewing service 204. At approximately the same time, or maybe just a moment after, the user of the second client device skips to frame 0, and the second client device 206 receives this input to skip to frame 0 and keeps the video paused. The second client device 206 sends a collaboration message 504 describing the state to the synchronized video viewing service 204.

The synchronized video viewing service 204 can receive the collaboration message 506 and collaboration message 504. In the example shown in FIG. 5, the collaboration message 504 is received by the synchronized video viewing service 204 just a little after the synchronized video viewing service 204 receives the collaboration message 506. Therefore, the synchronized video viewing service 204 processes the collaboration message 506 first by echoing the collaboration message 506 back to the first client device 208 and sending the collaboration message 506 to the second client device 206.

The message from the second client device 206 is not processed until the message from the first client device 208 has been processed and sent to all clients. Thus, after the collaboration message 506 has been sent to all clients, the synchronized video viewing service 204 processes the collaboration message 504 and echoes the collaboration message 504 back to the second client device 206, and sends it to the first client device 208.

In this example, the first client device 208 processes inputs in the order they are received. For example, the first client device 208 processes the play input to begin playing frame the video at frame 120. When the first client device 208 sends the collaboration message 506, it also increments its pending changes count. The next input the first client device 208 receives is an echo back of collaboration message 506, which it processes to decrement its pending changes count. At this time, the video is continuing to play. Then the first client device 208 receives the collaboration message 504 describing the skip to frame 0 and the playback pause. Since the pending changes count of the first client device 208 is 0, the first client device 208 processes the collaboration message 504 to skip to frame zero and pause the playback.

In this example, the second client device 206 will ignore collaboration message 506 because this message pertains to something that had happened before it sent collaboration message 504. For example, the second client device 206 processes the skip command to skip the video frame to frame 0 and pause the video. The second client device 206 sends the collaboration message 504 to the synchronized video viewing service 204, and along with sending collaboration message 504, the second client device 206 also increments its pending changes count. The next input the second client device 206 receives is collaboration message 506. However, since the pending changes count of the second client device 206 is greater than 0, the collaboration message 506 is ignored by the second client device 206. The playback state remains at frame zero and paused. Note that at this time, the first client device 208 may be playing the video at frame 120, and therefore the playback states between the two client devices may be briefly out of sync. Then the second client device 206 receives its own collaboration message 504 echoed back to it, and it processes this message to decrement the pending changes count. The playback state at the second client device 206 remains at frame zero and is paused, which is the same state that the first client device 208 maintains, and both client devices are in sync.

Figure 6:
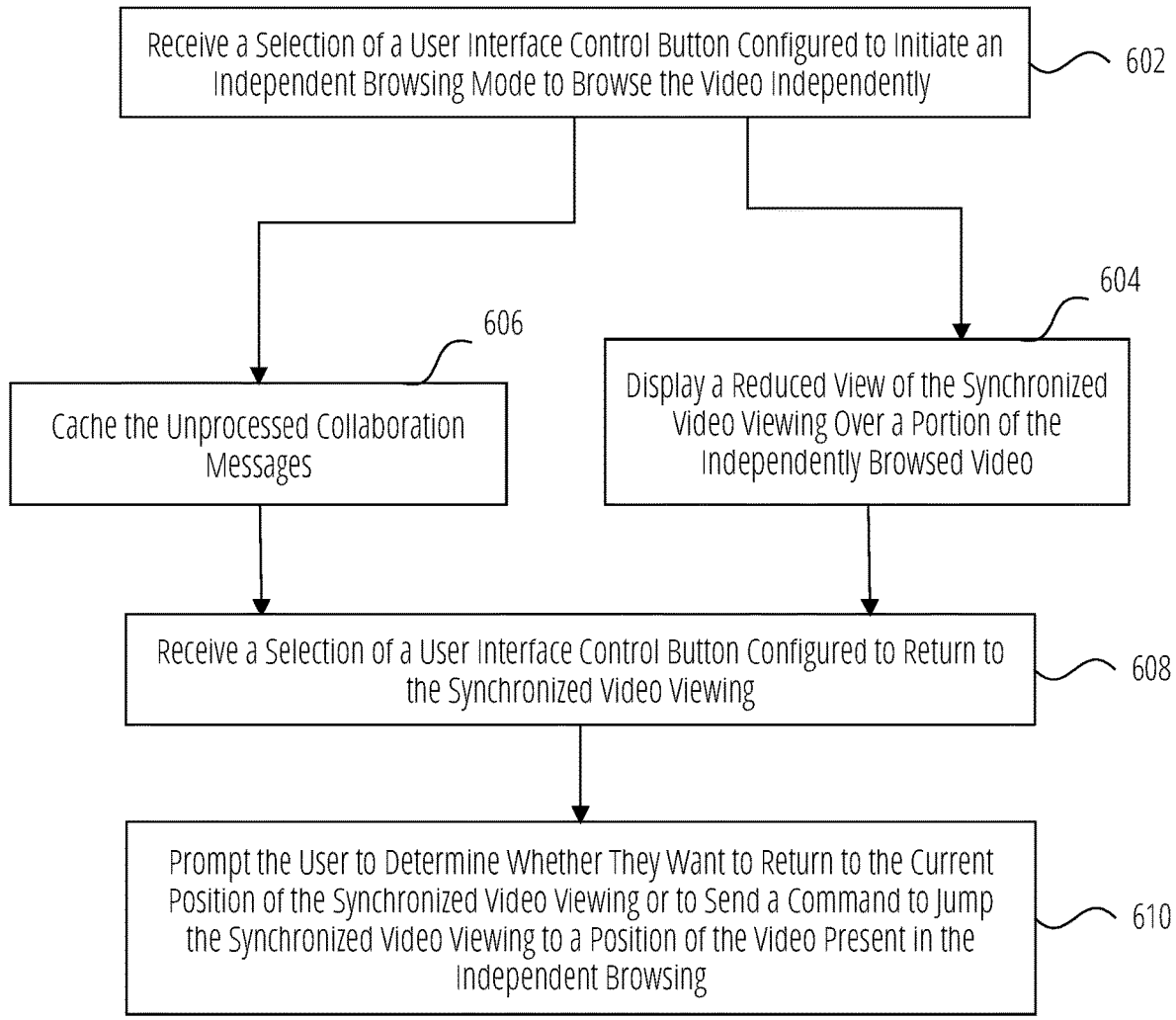
FIG. 6 illustrates an example for supporting a client device to independently browse a video that it is currently viewing as part of the synchronized video viewing in accordance with some aspects of the present technology.

FIG. 6 illustrates an example for supporting a client device to independently browse a video currently viewed as part of the synchronized video viewing. Although the example method depicts a particular sequence of operations, the sequence may be altered without departing from the scope of the present disclosure. For example, some of the operations depicted may be performed in parallel or in a different sequence that does not materially affect the function of the method illustrated in FIG. 4. In other examples, different components of an example device or system that implements the method may perform functions at substantially the same time or in a specific sequence.

In some embodiments, the method includes receiving a selection of a user interface control button configured to initiate an independent browsing mode to browse the video independently at block 602. For example, the first client device 208 or second client device 206 may receive a selection of a user interface control button configured to initiate an independent browsing mode to browse the video independently.

In some embodiments, the independent browsing mode allows the user to browse the video from the synchronized video viewing independently without sending collaboration messages and without processing the collaboration messages, thereby permitting the user to independently browse the video without interfering in the synchronized video viewing.

In some embodiments, the independent browsing mode facilitates caching the unprocessed collaboration messages at block 606. For example, the first client device 208 or second client device 206 may cache the unprocessed collaboration messages so that they can be processed if the first client device 208 or second client device 206 returns to the synchronized video viewing.

In some embodiments, the independent browsing mode includes displaying a reduced view of the synchronized video viewing over a portion of the independently browsed video in an independently browsed view, at block 604. For example, the first client device 208 or second client device 206 may display a reduced view of the synchronized video viewing over a portion of the independently browsed video in an independently browsed view. By this means, the user can independently browse the video while keeping track of the synchronized video viewing in the reduced view. In such an embodiment, the independent browsing mode allows the user to independently browse the video from the synchronized video viewing without sending collaboration messages, but the first client device 208 or second client device 206 continues to receive collaboration messages and processes them for the synchronized video in a reduced view but not for the independently browsed view.

In some embodiments, the method includes receiving a selection of a user interface control button configured to return to the synchronized video viewing at block 608. For example, the first client device 208 or second client device 206 may receive a selection of a user interface control button configured to return to the synchronized video viewing.

In some embodiments, the method includes prompting the user to determine whether they want to return to the current position of the synchronized video viewing or to send a command to jump the synchronized video viewing to a position of the video present in the independent browsing prior to returning to the synchronized video viewing at block 610. For example, the first client device 208 or second client device 206 can prompt the user to determine whether they want to return to the current position of the synchronized video viewing or to send a command to jump the synchronized video view to a position of the video present in the independent browsing. This can be useful when, while independently browsing the video, the user located a portion of the video that they want to view with the other users participating in the synchronized video viewing. The prompt can allow the user to jump the synchronized video viewing to the location in the video that they want to share with the group rather than having to rejoin the synchronized video viewing and then find the location of the video they want to share.

In some embodiments, when the user is participating in an independent browsing mode, the user can continue to receive audio from the synchronized video viewing. In such embodiments wherein the synchronized video viewing is accompanied by a voice channel so that users can discuss the video together, it can be desirable to leave the audio channel open even when a user moves to an independent browsing mode for the video content.

Figure 7A:
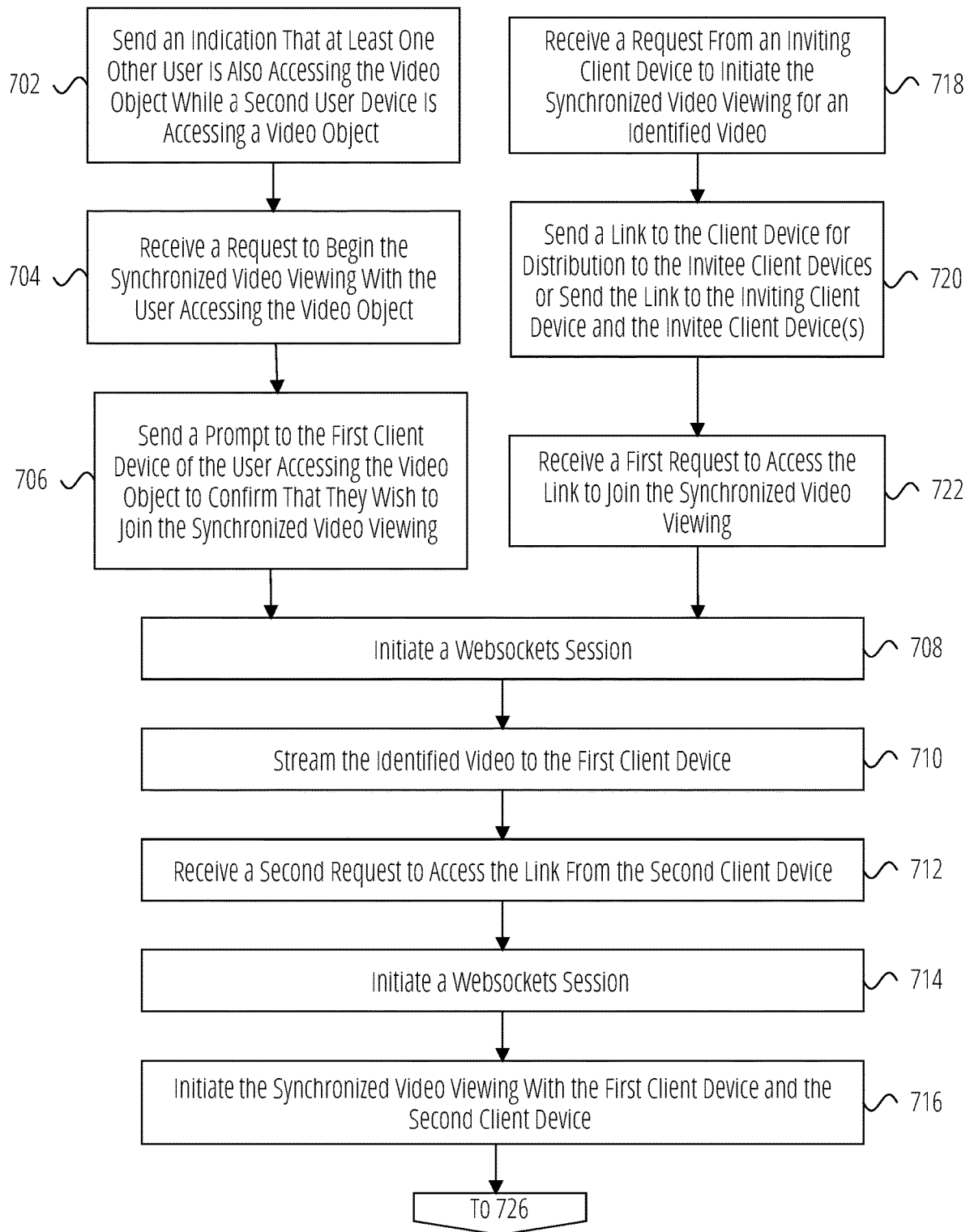
FIG. 7A and FIG. 7B illustrates an example method for joining a synchronized video viewing session hosted by the synchronized video viewing service in accordance with some aspects of the present technology.
Figure 7B:
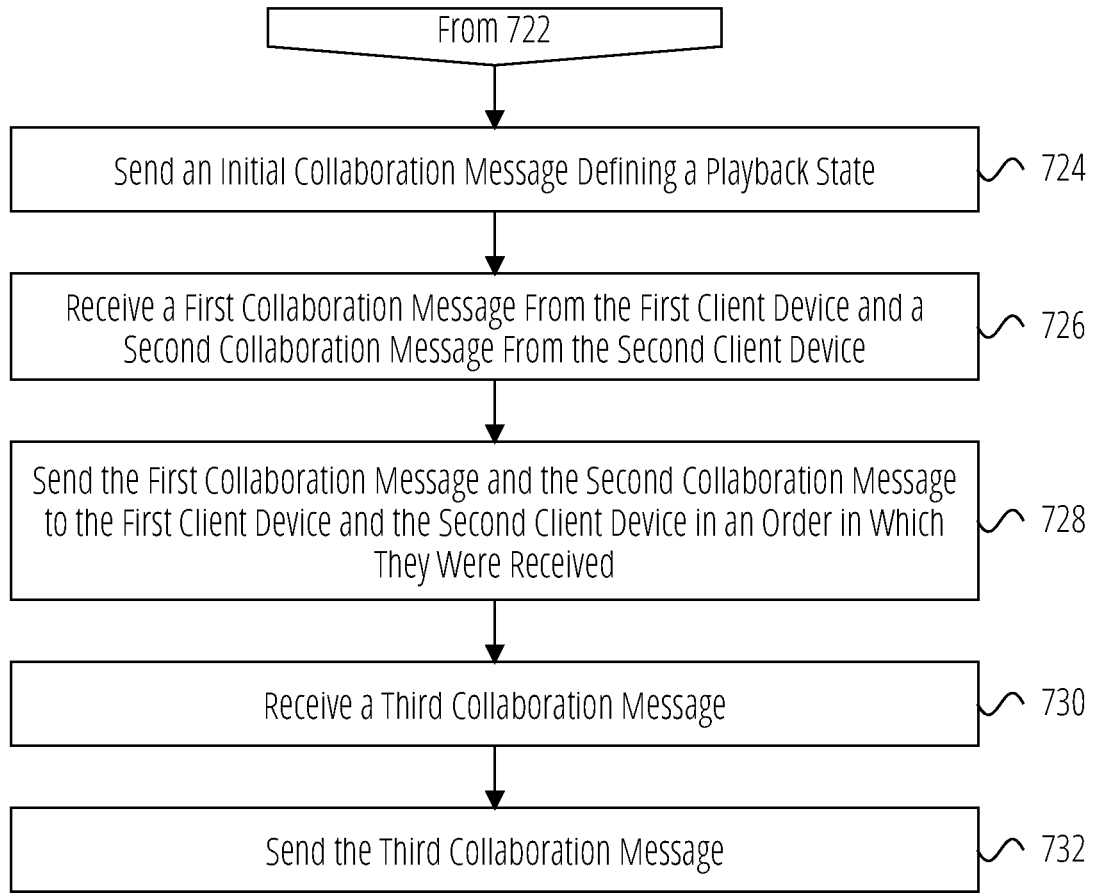

FIG. 7A and FIG. 7B illustrates an example method for joining a synchronized video viewing session hosted by the synchronized video viewing service 204. Although the example method depicts a particular sequence of operations, the sequence may be altered without departing from the scope of the present disclosure. For example, some of the operations depicted may be performed in parallel or in a different sequence that does not materially affect the function of the method. In other examples, different components of an example device or system that implements the method may perform functions at substantially the same time or in a specific sequence.

In some embodiments, the method includes sending an indication that at least one other user is also accessing a video object while a second user device is accessing the video object at block 702. For example, the synchronized video viewing service 204 may send an indication to a user operating the second client device 206 that at least one other user is also accessing the video object. The synchronized video viewing service 204 can inform client devices of presence information associated with users viewing the same video object. In some embodiments, the synchronized video viewing service 204 makes use of the collaboration service 112 to send the presence information.

In some embodiments, the method includes receiving a request to begin the synchronized video viewing with the user accessing the video object at block 704. For example, the synchronized video viewing service 204 may receive a request from the second client device 206 to begin the synchronized video viewing with another user accessing the video object.

In some embodiments, the method includes sending a prompt to the first client device of the user accessing the video object to confirm that they wish to join the synchronized video viewing at block 706. For example, the synchronized video viewing service 204 may send a prompt to the first client device 208 of the user accessing the video object to confirm that they wish to join the synchronized video viewing with the user operating the second client device 206.

In some embodiments, the method includes receiving a request from an inviting client device to initiate the synchronized video viewing for an identified video with an invitee client device(s) at block 718. For example, the synchronized video viewing service 204 may receive a request from an inviting client device such as the first client devices 208 or the second client device 206 to initiate the synchronized video viewing for an identified video with an invitee client device(s).

In some embodiments, the method includes sending a link to the client device for distribution to the invitee client devices or sending the link to the inviting client device and the invitee client device(s) at block 720. For example, the synchronized video viewing service 204 may send a link to the first client device 208 for distribution to the invitee client device(s). In this manner, the user of the first client device can send the link to the invitee users using any communication channel, such as email or group messaging, or other messaging services such as notification service 108, etc. In another example, the synchronized video viewing service 204 can send the link to the inviting client device and the invitee client device(s) directly using a messaging service such as email, text, group messaging, or other messaging services such as notification service 108. In some embodiments, the link is configured to join a link caller into the synchronized video viewing.

In some embodiments, the method includes receiving a first request to access the link from the first client device at block 722. For example, the synchronized video viewing service 204 may receive a first request to access the link from the first client device.

In some embodiments, the method includes initiating a connection with the first client device at block 708. In some embodiments, the connection is associated with a policy that requires messages to be sent in the order they are received. For example, the synchronized video viewing service 204 may initiate a WebSockets session with the first client device. In some embodiments, WebSockets is a protocol that provides two-way communication between a client device and the synchronized video viewing service 204. One attribute of WebSockets is that the protocol handles messages in the order they are received. In the context of the present technology, WebSockets can be used to echo any collaboration messages pertaining to the state of the video that is the subject of the synchronized video viewing received from any client device to all other client devices taking part in the synchronized video viewing, including the client device that sent the collaboration message.

In some embodiments, the method includes beginning streaming the identified video to the first client device at block 710. For example, the synchronized video viewing service 204 may begin streaming the identified video to the first client device.

In some embodiments, the method includes receiving a second request to access the link from the second client device at block 712. For example, the synchronized video viewing service 204 may receive a second request to access the link from the second client device 206.

In some embodiments, the method includes initiating a WebSockets session with the second client device at block 714. For example, the synchronized video viewing service 204 may initiate a WebSockets session with the second client device.

In some embodiments, the method includes initiating synchronized video viewing with the first and second clients at block 716. For example, the synchronized video viewing service 204 may initiate the synchronized video viewing with the first client device 208 and the second client device 206.

In some embodiments, the method includes sending an initial collaboration message defining a playback state at block 724. For example, the synchronized video viewing service 204 may send an initial collaboration message defining a playback state. In some embodiments, the video playback state is one of a paused, playing, seeking or a change of rate of playback state. The playback state is the present playback state of the video when the second client device 206 joins. The second client device uses the collaboration message to receive the playback state and update the playback state on the second client device to the playback state defined in the initial collaboration message. Thus the second client device 206 joins the synchronized video viewing in synchronization with the first client device.

In some embodiments, the method includes receiving a first collaboration message from the first client device and a second collaboration message from the second client device at block 726. For example, the synchronized video viewing service 204 may receive a first collaboration message from the first client device and a second collaboration message from the second client device. In some embodiments, the second collaboration message was received after the first collaboration message.

As addressed above, since the client devices are connected to the synchronized video viewing service 204 using a WebSockets session, all collaboration messages sent using the WebSockets communication channel will be processed in the order that they are received by the synchronized video viewing service 204.

In some embodiments, the method includes sending the first collaboration message and the second collaboration message to the first client device and the second client device in an order in which they were received at block 728. For example, the synchronized video viewing service 204 may send the first collaboration message and the second collaboration message to the first client device and the second client device in an order in which they were received by the synchronized video viewing service 204.

In some embodiments, the first client device and the second client device utilize a logical clock to determine which collaboration messages they should process. In some embodiments, as in the example illustrated in FIG. 6, the second client device receives the first collaboration message and ignores the first collaboration message since the second client device 206 had sent its own collaboration message and treats the first collaboration message as pertaining to an event that had happened before it sent the second collaboration message. When the second client device 206 receives the second collaboration message, it processes the second collaboration message. In some embodiments, the first client device receives the first collaboration message and processes the first collaboration message, and then receives the second collaboration message and processes the second collaboration message.

In some embodiments, the method includes receiving a third collaboration message after receiving the second collaboration message at block 730. For example, the synchronized video viewing service 204 may receive a third collaboration message after the receiving the second collaboration message, and then sending the third collaboration message to the first client device 208 and the second client device 206 at block 732 In some embodiments, the first client device 208 and second client device 206 process the third collaboration message by implementing a playback state defined by the third collaboration message. The first client device 208 and the second client device 206 process the third collaboration message because neither device has any pending collaboration messages, and thus their pending changes count is at zero, and they process the collaboration messages to stay in sync.

Figure 8:
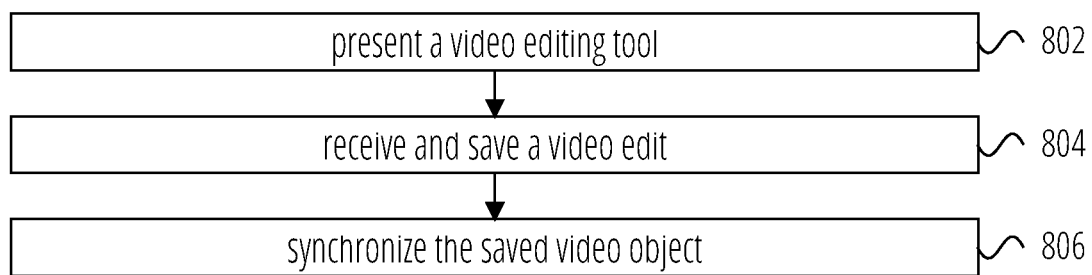
FIG. 8 illustrates an example method for presenting an editing tool and receiving and synchronizing an edit of the video object that is the subject of the synchronized video viewing in accordance with some aspects of the present technology.

FIG. 8 illustrates an example method for presenting an editing tool and receiving and synchronizing an edit of the video object that is the subject of the synchronized video viewing. Although the example method depicts a particular sequence of operations, the sequence may be altered without departing from the scope of the present disclosure. For example, some of the operations depicted may be performed in parallel or in a different sequence that does not materially affect the function of the method. In other examples, different components of an example device or system that implements the method may perform functions at substantially the same time or in a specific sequence.

As may be natural in many collaboration environments, the synchronized video viewing may result in a desire to edit the video that is the subject of the synchronized video viewing. As such, in some embodiments, the method includes presenting a video editing tool under the control of at least one of the first client devices or the second client device in the synchronized video viewing at block 802. For example, the synchronized video viewing service 204 may present a video editing tool under the control of at least one of the first client devices 208 or the second client device 206 in the synchronized video viewing. In some embodiments, all users of the synchronized video viewing can view the editing tool and actions taken under the control of at least one of the users. In some embodiments, the video editing tool is a video cropping tool, a lighting tool, an airbrushing tool, or any other editing tool. An example of a video editing tool is shown in FIG. 10D.

In some embodiments, the method includes receiving a video edit and saving the video edit to the video object stored at a content management system at block 804.

In some embodiments, the method includes synchronizing the saved video object reflecting the video edit to at least one client device at block 806. For example, the content management system 102 may synchronize the saved video object reflecting the video edit to at least one client device 134.

Figure 9:
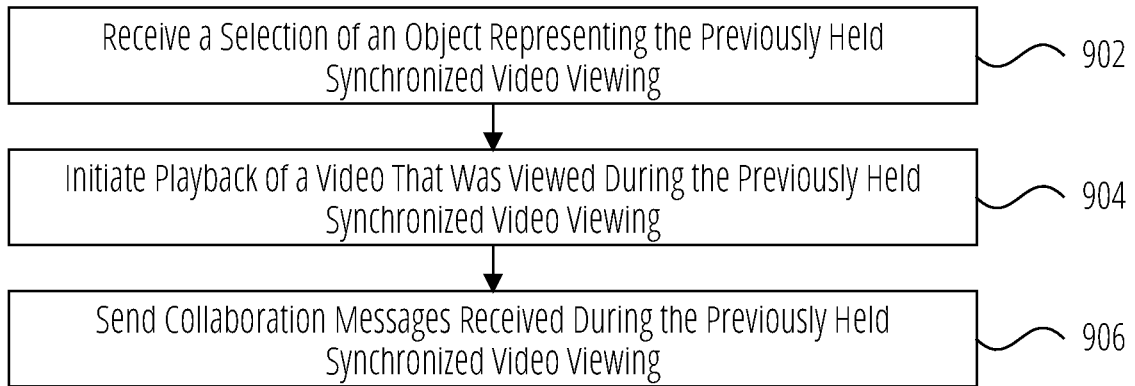
FIG. 9 illustrates an example method for reviewing a synchronized video viewing after it has ended in accordance with some aspects of the present technology.

FIG. 9 illustrates an example method for reviewing a synchronized video viewing after it has ended. Although the example method depicts a particular sequence of operations, the sequence may be altered without departing from the scope of the present disclosure. For example, some of the operations depicted may be performed in parallel or in a different sequence that does not materially affect the function of the method. In other examples, different components of an example device or system that implements the method may perform functions at substantially the same time or in a specific sequence.

It can sometimes be helpful to review a synchronized video viewing that has already occurred. Whether the user attended the live viewing and wants to refer back to the discussion, or the user missed the live viewing and wants to catch up with the discussions their team members had, a user may want to review the synchronized video viewing that has already occurred.

In some embodiments, the method includes receiving a selection of an object representing the previously held synchronized video viewing at block 902. For example, the client device 134 may receive a selection of an object representing the previously held synchronized video viewing. In some embodiments, the object representing the previously held synchronized video viewing is a shared link provided to the client device 134 via a messaging service or embedded into metadata associated with the video object or as a comment associated with the video object.

The selection of the object representing the previously held synchronized video viewing can result in the client device 134 contacting the synchronized video viewing service 204 via a communication to initiate the playback of the video. For example, the synchronized video viewing service 204 may receive the communication and in response, may initiate playback of the video that was viewed during the previously held synchronized video viewing.

In some embodiments, while the previously held synchronized video viewing occurred, the synchronized video viewing service 204 can have recorded and saved the collaboration messages that were exchanged during the previously held synchronized video viewing.

In some embodiments, the method includes sending the collaboration messages received during the previously held synchronized video viewing to the client device for processing at block 906. In some embodiments, the synchronized video viewing service 204 can send at least a portion of the collaboration messages to the client device 134 in a batch. The client device receives at least a portion of the collaboration messages and processes them according to a timestamp associated with the collaboration messages. In some embodiments, synchronized video viewing service 204 may stream the collaboration messages to the client device at times designated by a timestamp associated with the collaboration messages. The timestamp is correlated to the video playback, whereby the client device receives the collaboration messages just as if it were participating in the previously held synchronized video viewing.

Figure 10A:
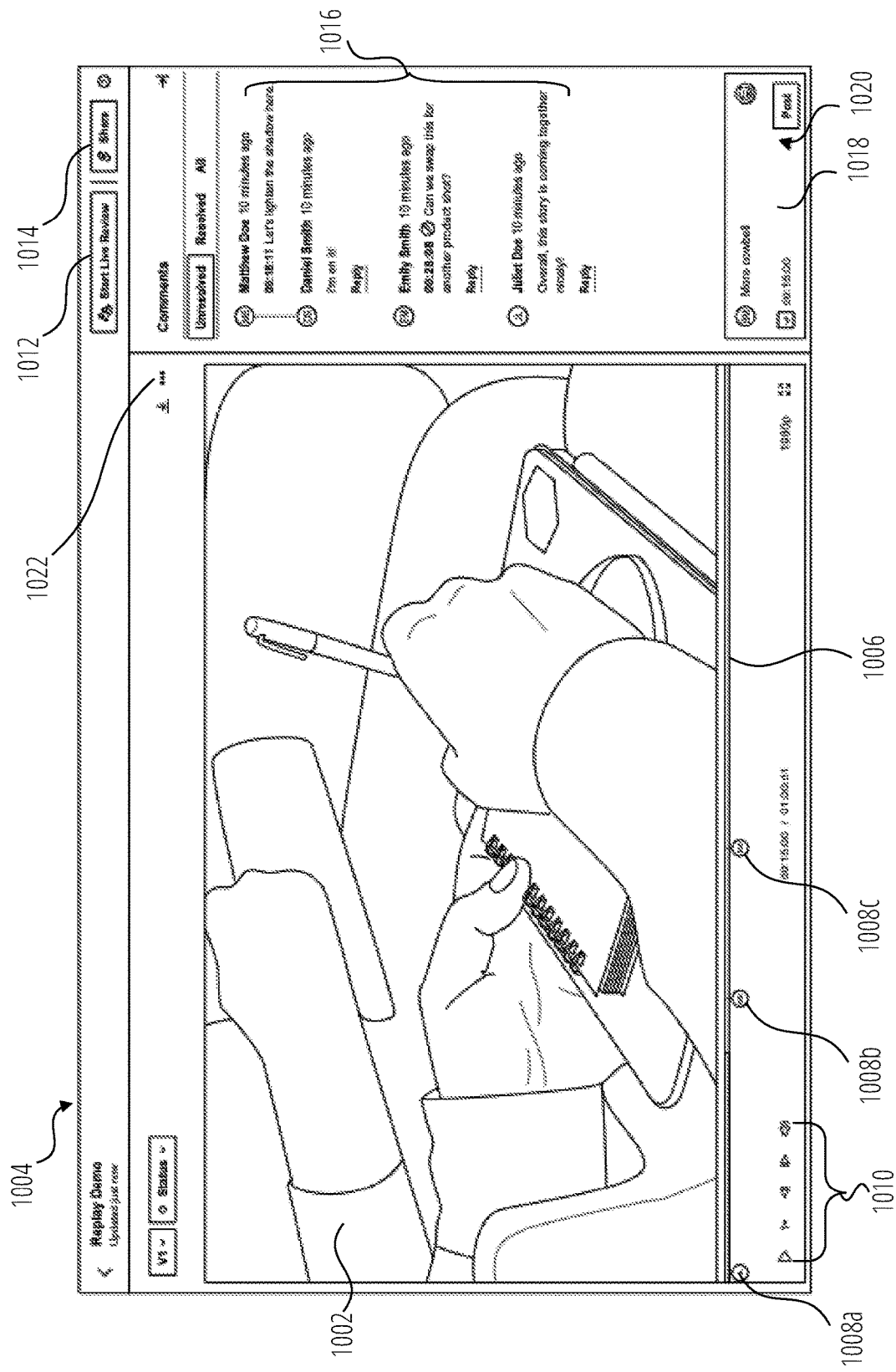
FIG. 10A illustrates an example interface for synchronized video viewing in accordance with some aspects of the present technology.

FIG. 10A illustrates an example interface for synchronized video viewing. As illustrated in FIG. 10A, a video 1002 is being played back in a video player 1004. Several different users are viewing the same video but they are not in a synchronized session. For example, icons illustrating users viewing the video are displayed along the playback progress bar 1006. For example, a first user is indicated by icon 1008*a*, a second user is indicated by icon 1008*b*, and a third user is indicated by icon 1008*c*. Each of these icons corresponds to a playback frame from the video player in which the respective user is viewing.

FIG. 10A also illustrates playback controls 1010. These can be used to change the playback rate, scrub the video, and pause and play the video 1002.

Should these users desire to start the live synchronized video viewing session, one of the users can click button 1012. Alternatively, one of the users could click button 1014 to receive a link to share to the users currently viewing the video 1002 and to other users. Users receiving the link can use the link the join the synchronized video viewing.

FIG. 10A also illustrates a comments pane 1016 where comments associated with video 1002 are displayed. In order to make comments, the user does not need to be in a synchronized video viewing session. The user can comment by entering it into comments interface 1018. Comments interface 1018 also includes an annotations button 1020, which allows the user to annotate video 1002 in video player 1004 and include a screen capture of the annotation in the comments pane 1016.

FIG. 10A also illustrates a more options button 1022 that can be used to launch a menu to bring up additional options related to viewing video 1002 in the video player 1004. For example, one option can be to bring up video editing tools.

Figure 10B:
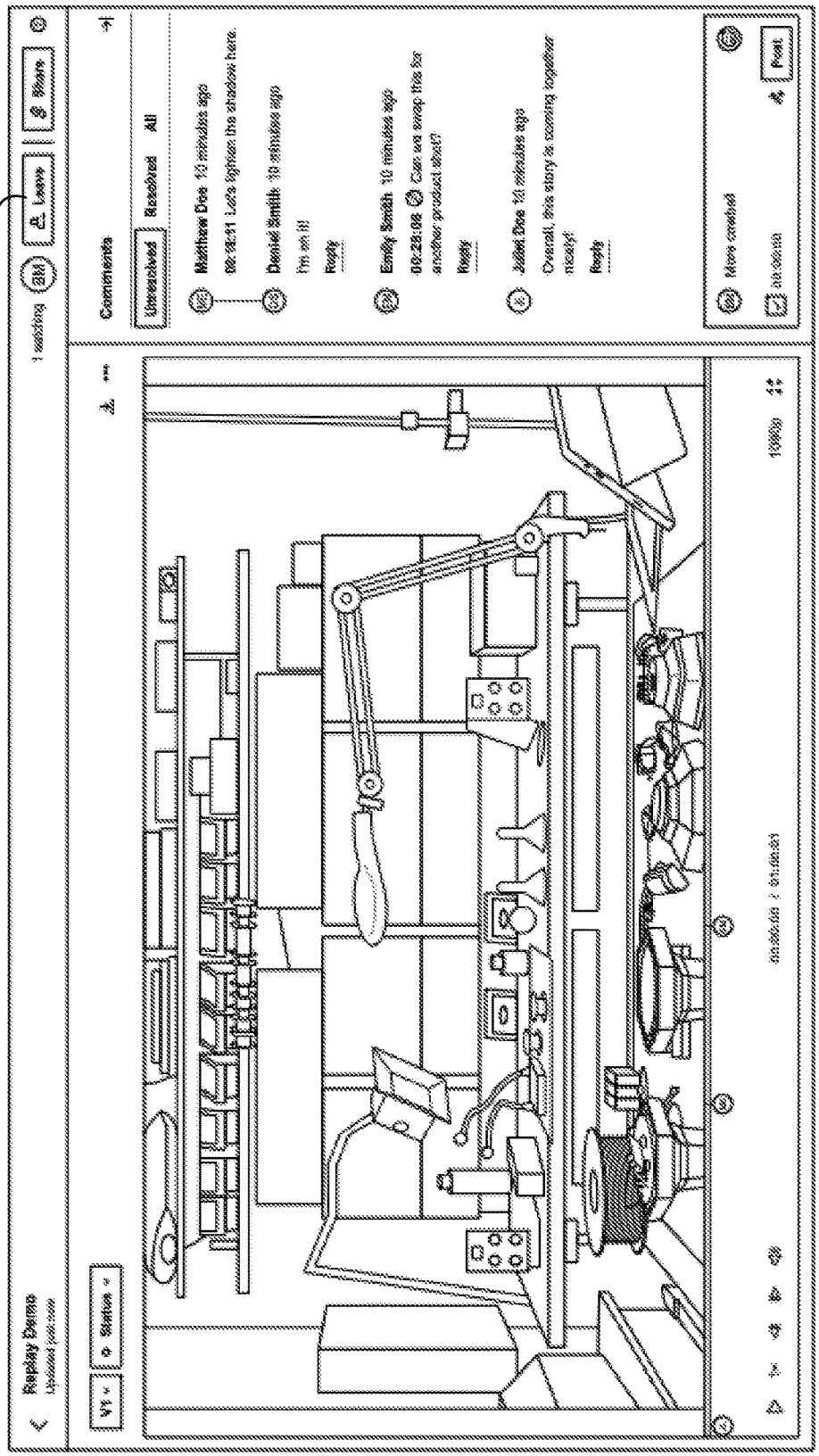
FIG. 10B illustrates an example interface for synchronized video viewing in accordance with some aspects of the present technology.

FIG. 10B illustrates another example interface for synchronized video viewing. Similar to the interface illustrated in FIG. 10A, a video 1024 is being played back in video player 1004. However, in FIG. 10B the user is engaged in synchronized video viewing. In some embodiments, some users may be independently viewing video 1002 while the synchronized video viewing is occurring. For example, users 1008*b* and 1008*c* appear to be independently viewing video 1002 because icons representing their presence viewing video 1002 are not located at the current playback position of the video in this user interface, which is at the start of the video.

When a user is engaged in synchronized video viewing, as illustrated in FIG. 10B, the user can be presented with an option such as button 1024 to leave the synchronized video viewing and return to independently viewing the video.

Figure 10C:
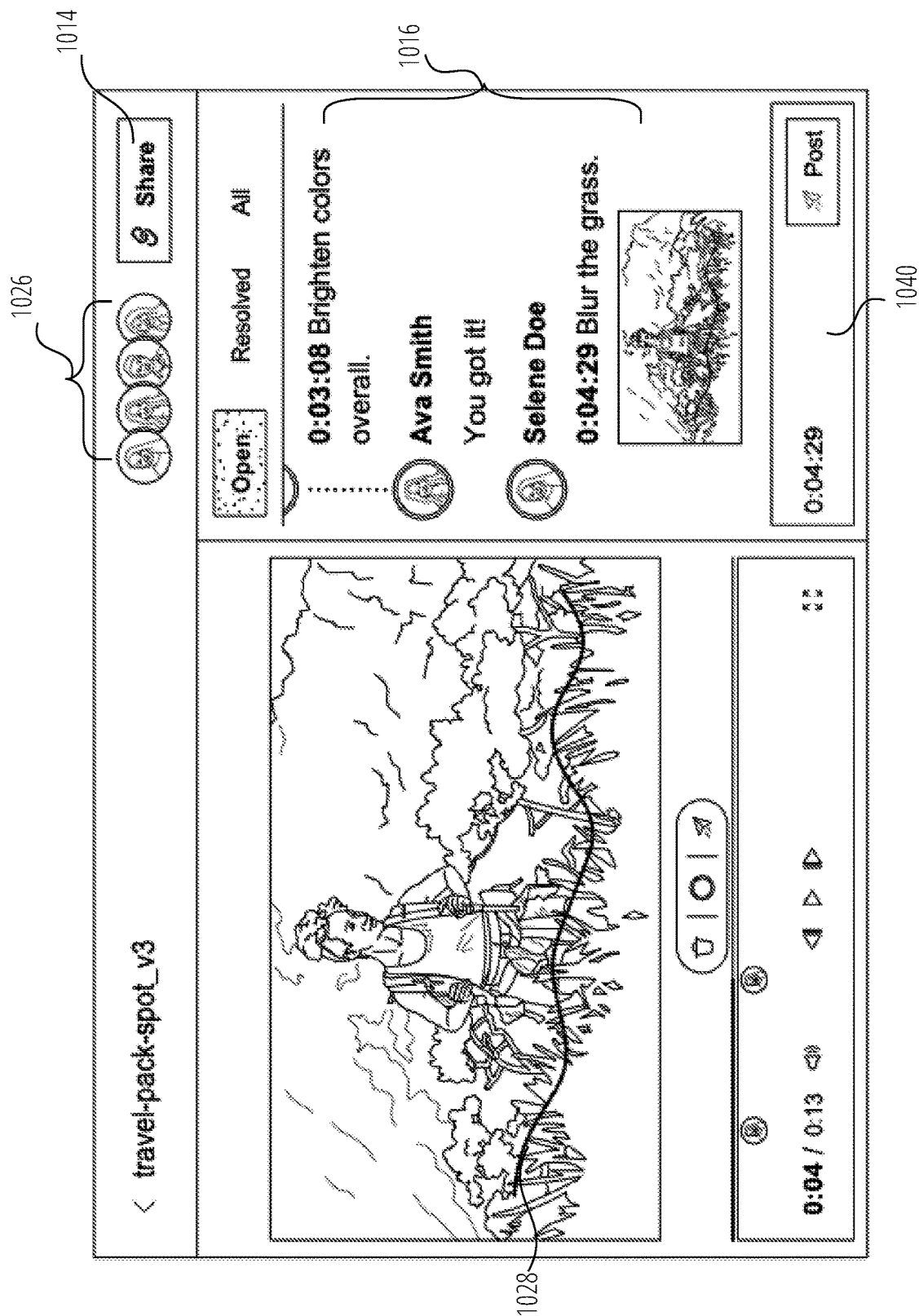
FIG. 10C illustrates another example interface for synchronized video viewing demonstrating video annotation capabilities in accordance with some aspects of the present technology.
Figure 10D:
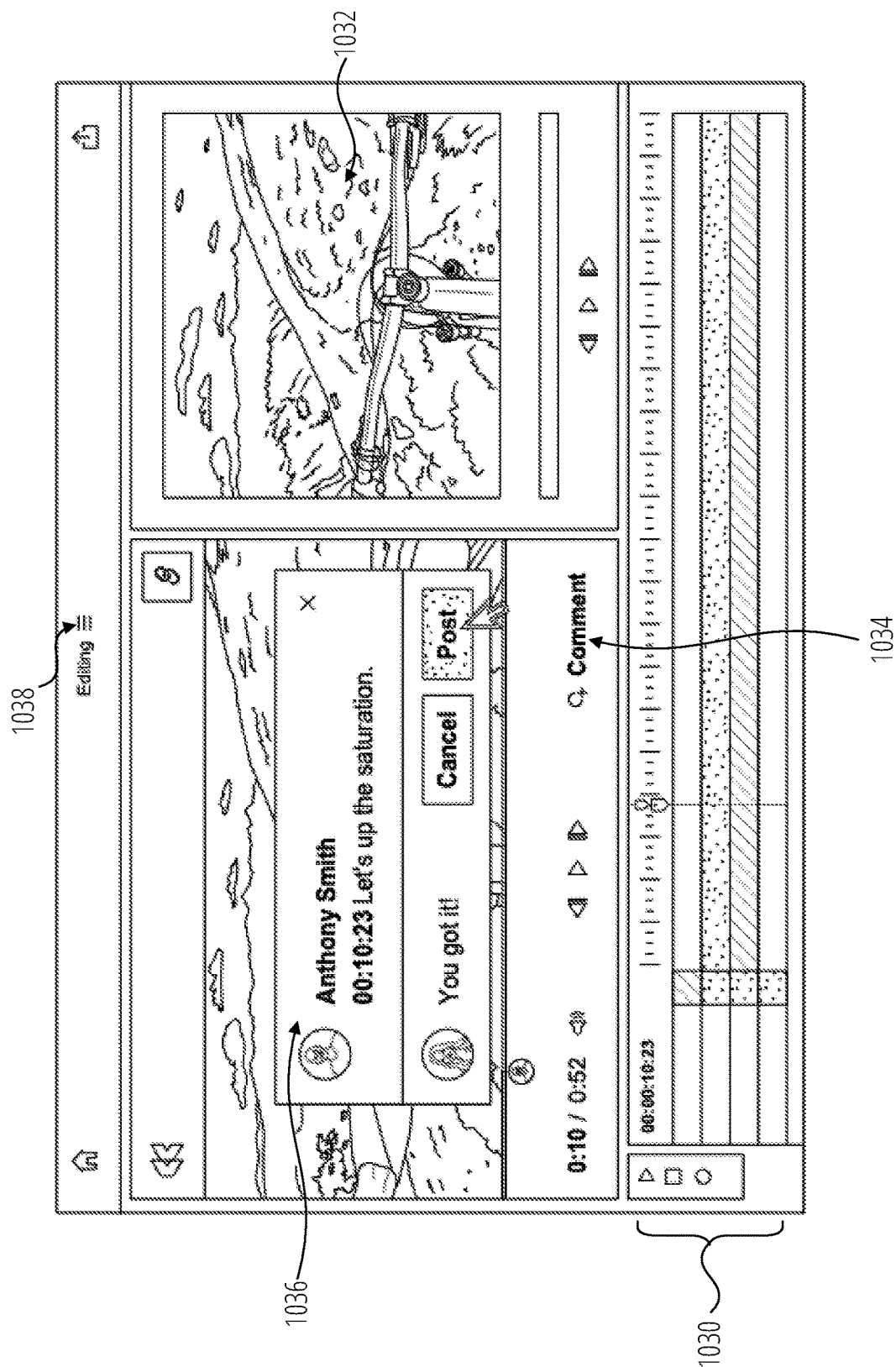
FIG. 10D illustrates another example user interface for synchronized video viewing demonstrating video editing capabilities in accordance with some aspects of the present technology.

FIG. 10C illustrates another example interface for synchronized video viewing. The interface illustrated in FIG. 10C provides an emphasis on the video annotation capabilities of the present technology. As seen in FIG. 10C, there is a collection of users participating in the synchronized video viewing as demonstrated from the collection of faces in face pile 1026. Furthermore, video 1002 has been annotated with an annotation 1028, and a screenshot of the annotated video has been posted as a comment in comments pane 1016.

FIG. 10D illustrates another example user interface for synchronized video viewing. The interface illustrated in FIG. 10D provides an emphasis on video editing capabilities of the present technology. As illustrated in FIG. 10D, a video editing tool 1030 is being used to adjust the saturation of the video. The video can be edited using the tool 1030 while the results of the edit can be seen in viewing pane 1032.

Additionally FIG. 10D illustrates an alternative commenting interface where a user can select commenting button 1034 to provide a comment or reply to a comment such as comment 1036.

Additionally FIG. 10D illustrates an editing menu 1038, where a user may select the editing menu 1038 to view other editing tools for editing the video.

While the present disclosure uses an example of synchronized video viewing to explain the present technology, the technology for the synchronized video viewing can also be used for any synchronized media experience such as a synchronized audio experience, synchronized mixed-media experience, synchronized viewing of image(s), document(s), and slide show(s), etc.

While the present description refers to synchronized video, it should be understood that as used herein, synchronized does not require strict synchronization. A client device may be only approximately synchronized (within 1-2 seconds) with other users in the synchronized video viewing. Additionally, as noted above, the present technology permits client devices to explicitly ignore a collaboration message in favor of providing the user with a better user experience. Accordingly, the use of the term synchronized does not require strict synchronization, but rather two users viewing the same video at the same time but on remote devices should by synchronized enough that any lack of synchronization should be minimally perceptible, if perceptible at all.

While the present description refers to a first of something or a second of something, such as a second client device, it should be appreciated that this a mechanism to differentiate one from another and not to indicate how many of something exist. For example, a first client device is a different client device than a second client device, but there can be any number of first client devices or second client devices.

Figure 11:
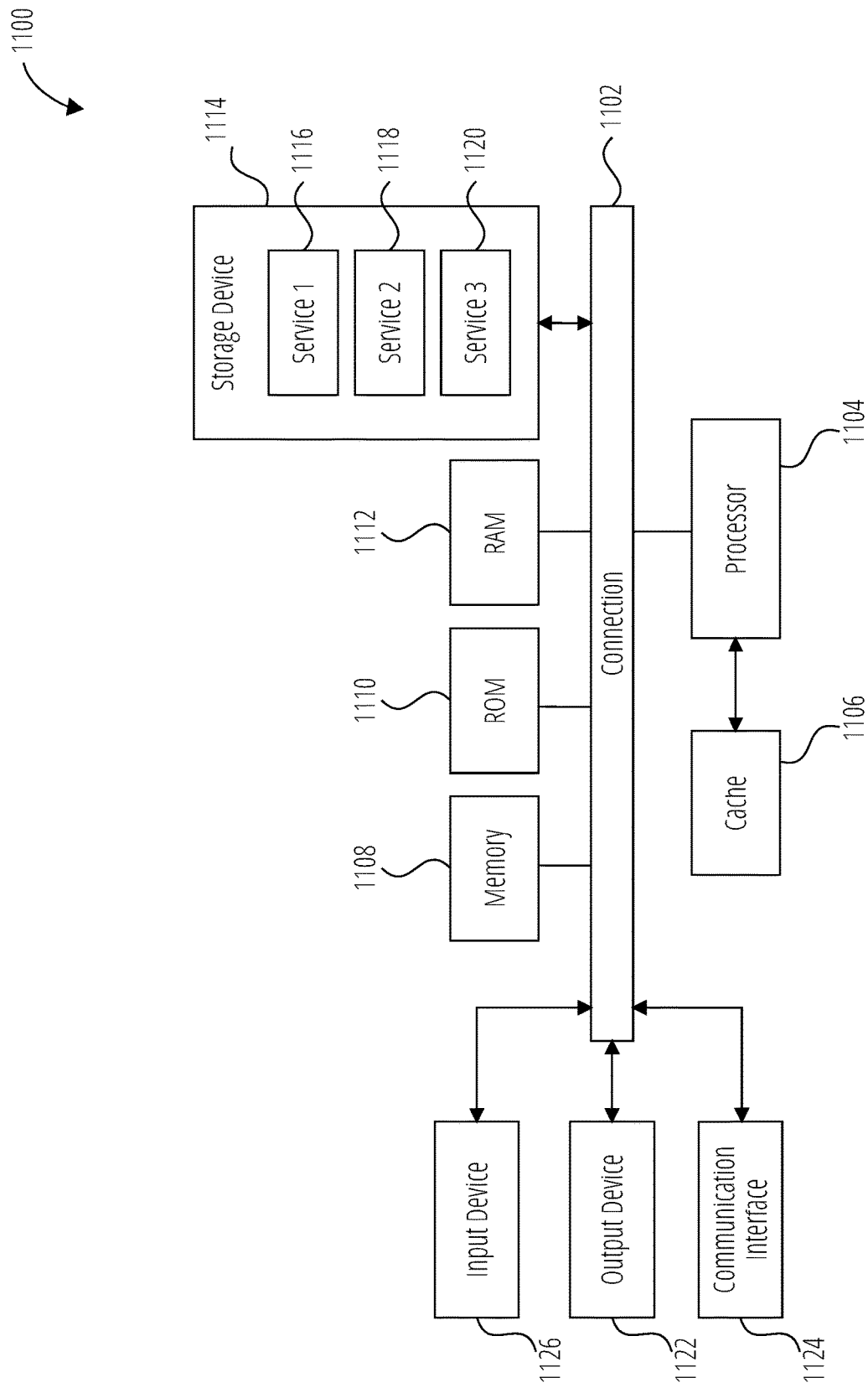
FIG. 11 shows an example of a system for implementing certain aspects of the present technology.

FIG. 11 shows an example of computing system 1100, which can be for example any computing device making up synchronized video viewing service 204 or content management system 102 or client devices 134, or any component thereof in which the components of the system are in communication with each other using connection 1102. Connection 1102 can be a physical connection via a bus, or a direct connection into processor 1104, such as in a chipset architecture. Connection 1102 can also be a virtual connection, networked connection, or logical connection.

In some embodiments, computing system 1100 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example computing system 1100 includes at least one processing unit (CPU or processor) 1104 and connection 1102 that couples various system components including system memory 1108, such as read-only memory (ROM) 1110 and random access memory (RAM) 1112 to processor 1104. Computing system 1100 can include a cache of high-speed memory 1106 connected directly with, in close proximity to, or integrated as part of processor 1104.

Processor 1104 can include any general purpose processor and a hardware service or software service, such as services 1116, 1118, and 1120 stored in storage device 1114, configured to control processor 1104 as well as a special-purpose processor where software instructions are incorporated into the actual processor design. Processor 1104 may essentially be a completely self-contained computing system, containing multiple cores or processors, a bus, memory controller, cache, etc. A multi-core processor may be symmetric or asymmetric.

To enable user interaction, computing system 1100 includes an input device 1126, which can represent any number of input mechanisms, such as a microphone for speech, a touch-sensitive screen for gesture or graphical input, keyboard, mouse, motion input, speech, etc. Computing system 1100 can also include output device 1122, which can be one or more of a number of output mechanisms known to those of skill in the art. In some instances, multimodal systems can enable a user to provide multiple types of input/output to communicate with computing system 1100. Computing system 1100 can include communication interface 1124, which can generally govern and manage the user input and system output. There is no restriction on operating on any particular hardware arrangement, and therefore the basic features here may easily be substituted for improved hardware or firmware arrangements as they are developed.

Storage device 1114 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read-only memory (ROM), and/or some combination of these devices.

The storage device 1114 can include software services, servers, services, etc., that when the code that defines such software is executed by the processor 1104, it causes the system to perform a function. In some embodiments, a hardware service that performs a particular function can include the software component stored in a computer-readable medium in connection with the necessary hardware components, such as processor 1104, connection 1102, output device 1122, etc., to carry out the function.

For clarity of explanation, in some instances, the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program or a collection of programs that carry out a specific function. In some embodiments, a service can be considered a server. The memory can be a non-transitory computer-readable medium.

In some embodiments, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer-readable media. Such instructions can comprise, for example, instructions and data which cause or otherwise configure a general purpose computer, special purpose computer, or special purpose processing device to perform a certain function or group of functions. Portions of computer resources used can be accessible over a network. The executable computer instructions may be, for example, binaries, intermediate format instructions such as assembly language, firmware, or source code. Examples of computer-readable media that may be used to store instructions, information used, and/or information created during methods according to described examples include magnetic or optical disks, solid-state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smartphones, small form factor personal computers, personal digital assistants, and so on. The functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Illustrative examples of the disclosure include:

Aspect 1. A method of facilitating synchronized video viewing of a video object by remote participants, the method comprising: sending a second collaboration message to a synchronized video viewing service configured to facilitate synchronized video viewing, wherein the synchronized video viewing service configured to facilitate synchronized video viewing has also received one or more first collaboration messages from one or more first client devices participating in the synchronized video viewing with a second client device; receiving the one or more first collaboration messages and the second collaboration message from the synchronized video viewing service configured to facilitate synchronized video viewing, wherein the one or more first collaboration messages and the second collaboration message are received in an order received at the synchronized video viewing service configured to facilitate synchronized video viewing, wherein the one or more first collaboration messages are ordered prior to the second collaboration message, whereby the one or more first collaboration messages are received prior to the second collaboration message; ignoring the one or more first collaboration messages by the second client device; and processing the second collaboration message by the second client device.

Aspect 2. The method of Aspect 1 further comprising: receiving a third collaboration message after the receiving of the second collaboration message by the second client device; and processing the third collaboration message by implementing a playback state defined by the third collaboration message.

Aspect 3. The method of any of Aspects 1 to 2, further comprising: associated with the sending of the second collaboration message, incrementing a pending changes count on the second client device; while the pending changes count is greater than zero, ignoring any collaboration messages originating from a device other than the second client device.

Aspect 4. The method of any of Aspects 1 to 3, wherein the processing the second collaboration message comprises: decrementing the pending changes count.

Aspect 5. The method of any of Aspects 1 to 4, wherein the pending changes count is a logical clock.

Aspect 6. The method of any of Aspects 1 to 5, further comprising: prior to the sending the second collaboration message, determining by the second device that a playback event has originated from a user input received by the second device; calculate a frame and a playback rate after the playback event; and prepare the second collaboration message when the frame or playback rate has changed.

Aspect 7. The method of any of Aspects 1 to 6, further comprising: receiving an initial collaboration message defining a playback state; whereby no collaboration message will result from updating the playback state on the second client device; and updating the playback state on the second client device to the playback state defined in the initial collaboration message.

Aspect 8. The method of any of Aspects 1 to 7, wherein the updating the playback state on the second client device to the playback state defined in the initial collaboration message further comprises: calculating a correct client time using a frame number and a frame rate of the video in the initial collaboration message; if the state is playing in the initial collaboration message, setting the correct client time, playing the video, or if the state is paused in the initial collaboration message, setting the correct client time and pausing the video; and reenabling the client event handler.

Aspect 9. The method of any of Aspects 1 to 8, wherein the initial collaboration message is received after a period in which the synchronized video viewing has already elapsed, whereby the second client device caught up with the remote participants that were already viewing the video.

Aspect 10. The method of any of Aspects 1 to 9, further comprising: prior to the receiving the initial collaboration message, receiving a link from the synchronized video viewing service configured to facilitate synchronized video viewing; activating the link by the second client device; joining the synchronized video viewing by the client device.

Aspect 11. The method of any of Aspects 1 to 10, further comprising: establishing a WebSockets connection by the second client device with the synchronized video viewing service configured to facilitate synchronized video viewing, wherein WebSockets is a protocol for bi-directional messaging that handles messages in the order they are received.

Aspect 12. The method of any of Aspects 1 to 11, wherein a collaboration message such as the one or more first collaboration messages or the second collaboration message includes a video frame and video state.

Aspect 13. The method of any of Aspects 1 to 12, wherein the video state is one of a paused, playing, seeking or a change of rate of playback state.

Aspect 14. The method of any of Aspects 1 to 13, further comprising: accessing the video object on the second client device using an application on the second client device; while accessing the video object on the second client device, receiving an indication that at least one other user is also accessing the video object; requesting to begin the synchronized video viewing with the user also accessing the video object by viewing the video object in synchronization with the other user; and initiating the synchronized video viewing with the user in a web browser on the second client device.

Aspect 15. The method of any of Aspects 1 to 14 further comprising: receiving a selection of a user interface control button configured to initiate an independent browsing mode to browse the video independently.

Aspect 16. The method of any of Aspects 1 to 15, wherein the independent browsing mode allows the user to independently browse the video from the synchronized video viewing without sending collaboration messages and without processing the collaboration messages, thereby permitting the user to independently browse the video without interfering in the synchronized video viewing and without the synchronized video viewing interfering with ongoing synchronized video viewing by other remote participates.

Aspect 17. The method of any of Aspects 1 to 16, further comprising: caching the unprocessed collaboration messages.

Aspect 18. The method of any of Aspects 1 to 17, further comprising: whereby the user can independently browse the video while keeping track of the synchronized video viewing the in the reduced view.

Aspect 19. The method of any of Aspects 1 to 18, wherein the independent browsing mode allows the user to independently browse the video from the synchronized video viewing without sending collaboration messages, the second client device continues to receive collaboration messages and processes them for the synchronized video in the reduced view but not for the independently browsed view.

Aspect 20. The method of any of Aspects 1 to 19, further comprising: receiving a selection of a user interface control button configured to return to the synchronized video viewing.

Aspect 21. The method of any of Aspects 1 to 20, further comprising: prior to returning to the synchronized video viewing, prompting the user to determine whether they want to return to the current position of the synchronized video viewing or to send a command to jump the synchronized video viewing to a position of the video present in the independent browsing.

Aspect 22. A method of facilitating synchronized video viewing of a video object by remote participants, the method comprising: receiving a first collaboration message from a first client device and a second collaboration message from a second client device, wherein the first client device and the second client device are participating in the synchronized video viewing, wherein the second collaboration message was received after the first collaboration message; and sending the first collaboration message and the second collaboration message to the first client device and the second client device in an order in which they were received, wherein the second client device receives the first collaboration message and ignores the first collaboration message, and then receives the second collaboration message and processes the second collaboration message.

Aspect 23. The method of Aspect 22, wherein the first client device receives the first collaboration message and processes the first collaboration message and then receives the second collaboration message and processes the second collaboration message.

Aspect 24. The method of any of Aspects 22 to 23, further comprising: receiving a third collaboration message after the receiving of the second collaboration message; sending the third collaboration message to the first client device and the second client device, wherein the first client device and second client device process the third collaboration message by implementing a playback state defined by the third collaboration message.

Aspect 25. The method of any of Aspects 22 to 24, wherein the first client device and the second client device utilize a logical clock to determine which collaboration messages they should process.

Aspect 26. The method of any of Aspects 22 to 25, further comprising: establishing a WebSockets connection with the first client device and the second client device, wherein the WebSockets connection is a protocol for bi-directional messaging that handles messages in the order they are received. the WebSockets connection is used to handle the receiving and sending of collaboration messages.

Aspect 27. The method of any of Aspects 22 to 26, wherein a collaboration message such as the first collaboration message or the second collaboration message includes a video frame and video state.

Aspect 28. The method of any of Aspects 22 to 27, wherein the video state is one of a paused, playing, seeking or a change of rate of playback state.

Aspect 29. The method of any of Aspects 22 to 28, further comprising: receiving a request from an inviting client device such as the first client device or the second client device to initiate the synchronized video viewing for an identified video with an invitee client device(s); sending a link to the client device for distribution to the invitee client devices or sending the link to the inviting client device and the invitee client device(s), wherein the link is configured to join a link caller into the synchronized video viewing.

Aspect 30. The method of any of Aspects 22 to 29, further comprising: receiving a first request to access the link from the first client device; initiating a WebSockets session with the first client device; and begin streaming the identified video to the first client device.

Aspect 31. The method of any of Aspects 22 to 30, further comprising: receiving a second request to access the link from the second client device; initiating a WebSockets session with the second client device; and whereby the second client device updates the playback state on the second client device to the playback state defined in the initial collaboration message and joins the synchronized video viewing in synchronization with the first client device.

Aspect 32. The method of any of Aspects 22 to 31, further comprising: sending presence information for one or more objects, including a video object, wherein a user of the second client device can view information about a user that is accessing the one or more objects; receiving a request to begin the synchronized video viewing with the user accessing the video object; sending a prompt to the first client device of the user accessing the video object to confirm that they wish to join the synchronized video viewing; and initiating the synchronized video viewing with the first client device and the second client device.

Aspect 33. The method of any of Aspects 22 to 32, further comprising: while a second user device is accessing a video object, sending an indication that at least one other user is also accessing the video object; receiving a request to begin the synchronized video viewing with the user accessing the video object; sending a prompt to the first client device of the user accessing the video object to confirm that they wish to join the synchronized video viewing; and initiating the synchronized video viewing with the first client device and the second client device.

Aspect 34. The method of any of Aspects 22 to 33, further comprising: during the synchronized video viewing, presenting a video editing tool under the control of at least one of the first client devices or the second client device in the synchronized video viewing, wherein all users of the synchronized video viewing can view the editing tool and actions taken under the control of the at least one of the users; receiving a video edit and saving the video edit to the video object stored at a content management system.

Aspect 35. The method of any of Aspects 22 to 34, wherein the video editing tool is a video cropping tool.

Aspect 36. The method of any of Aspects 22 to 35, further comprising: synchronizing the saved video object reflecting the video edit to at least one client device.

Aspect 37. The method of any of Aspects 22 to 36, wherein the technology for the synchronized video viewing can be used for a synchronized audio experience, synchronized viewing of image(s), document(s), and a slide show.

Aspect 38. A method for reviewing a previously held synchronized video viewing of a video object by a client device, the method comprising: receiving a selection of an object representing the previously held synchronized video viewing; initiating playback of a video that was viewed during the previously held synchronized video viewing; sending collaboration messages received during the previously held synchronized video viewing to the client device for processing.

Aspect 39. The method of Aspect 38, wherein the sending of the collaboration messages further comprises: sending at least a portion of the collaboration messages in a batch, wherein the client device receives the at least a portion of the collaboration messages and processes them according to a timestamp associated with the collaboration messages, wherein the timestamp is correlated to the video playback.

Aspect 40. The method of any of Aspects 38 to 39, wherein the sending of the collaboration messages further comprises: sending the collaboration messages to the client device at a time designated by a timestamp associated with the collaboration messages, wherein the timestamp is correlated to the video playback, whereby the client device receives the collaboration messages just as if it were participating in the previously held synchronized video viewing.

Aspect 41. The method of any of Aspects 38 to 40, wherein the object is a shared link provided to the client device via a messaging service, or embedded into metadata associated with the video object, or as a comment associated with the video object.

Aspect 42. A system for facilitating synchronized video viewing by remote participants, the system comprising: a synchronized video viewing service, the synchronized video viewing service configured to receive a first collaboration message from a first client device and a second collaboration message from a second client device, wherein the second collaboration message is after the first collaboration message, and to send the first collaboration message and the second collaboration message to the first client device and the second client device in an order in which they were received; the first client device configured to receive the first collaboration message and process the first collaboration message and then receive the second collaboration message and process the second collaboration message; and the second client device is configured to receive the first collaboration message and the second collaboration message by the second client device and ignore the first collaboration message but process the second collaboration message.

What is claimed is:

1. A method of facilitating synchronized video viewing of a video object by remote participants, the method comprising:

sending, by a second client device, a second collaboration message to a synchronized video viewing service configured to facilitate synchronized video viewing, wherein the synchronized video viewing service configured to facilitate synchronized video viewing has also received one or more first collaboration messages from one or more first client devices participating in the synchronized video viewing with the second client device;

receiving, by the second client device, the one or more first collaboration messages and the second collaboration message from the synchronized video viewing service configured to facilitate synchronized video viewing, wherein the one or more first collaboration messages and the second collaboration message are received in an order received at the synchronized video viewing service configured to facilitate synchronized video viewing, wherein the one or more first collaboration messages are ordered prior to the second collaboration message, whereby the one or more first collaboration messages are received prior to the second collaboration message;

ignoring the one or more first collaboration messages by the second client device; and processing the second collaboration message by the second client device.

2. The method of claim 1 further comprising:
receiving a third collaboration message after the receiving of the second collaboration message by the second client device; and
processing the third collaboration message by implementing a playback state defined by the third collaboration message.

3. The method of claim 1, further comprising:
associated with the sending of the second collaboration message, incrementing a pending changes count on the second client device;
while the pending changes count is greater than zero, ignoring any collaboration messages originating from a device other than the second client device.

4. The method of claim 3, wherein the processing the second collaboration message comprises:
decrementing the pending changes count.

5. The method of claim 3, wherein the pending changes count is a logical clock.

6. The method of claim 1, further comprising:
receiving an initial collaboration message defining a playback state;
whereby no collaboration message will result from updating the playback state on the second client device; and
updating the playback state on the second client device to the playback state defined in the initial collaboration message.

7. The method of claim 1, further comprising:
establishing a WebSockets connection by the second client device with the synchronized video viewing service configured to facilitate synchronized video viewing, wherein WebSockets is a protocol for bi-directional messaging that handles messages in the order they are received.

8. The method of claim 1 further comprising:
receiving a selection of a user interface control button configured to initiate an independent browsing mode to browse the video independently.

9. A non-transitory computer-readable medium comprising instructions for facilitating synchronized video viewing of a video object by remote participants stored thereon, the instructions effective to cause at least one processor to:
receive a first collaboration message from a first client device and a second collaboration message from a second client device, wherein the first client device and the second client device are participating in the synchronized video viewing, wherein the second collaboration message was received after the first collaboration message; and
send the first collaboration message and the second collaboration message to the first client device and the second client device in an order in which they were received, wherein sending the first collaboration message and the second collaboration message in the order in which they were received causes the second client device to ignore the first collaboration message and process the second collaboration message.

10. The non-transitory computer-readable medium of claim 9, wherein sending the first collaboration message and the second collaboration message in the order in which they were received causes the first client device to receive and process the first collaboration message and then receive and process the second collaboration message.

11. The non-transitory computer-readable medium of claim 9, wherein the instructions are further effective to cause the at least one processor to:
receive a third collaboration message after the receiving of the second collaboration message;
send the third collaboration message to the first client device and the second client device, wherein sending the third collaboration message causes the first client device and second client device to process the third collaboration message by implementing a playback state defined by the third collaboration message.

12. The non-transitory computer-readable medium of claim 9, wherein the first client device and the second client device utilize a logical clock to determine which collaboration messages they should process.

13. The non-transitory computer-readable medium of claim 9, wherein the instructions are further effective to cause the at least one processor to:
establish a WebSockets connection with the first client device and the second client device, wherein the WebSockets connection is a protocol for bi-directional messaging that handles messages in the order they are received, the WebSockets connection is used to handle the receiving and sending of collaboration messages.

14. The non-transitory computer-readable medium of claim 9, wherein the instructions are further effective to cause the at least one processor to:
receive a request from an inviting client device such as the first client device or the second client device to initiate the synchronized video viewing for an identified video with an invitee client device(s);
send a link to the client device for distribution to the invitee client devices or sending the link to the inviting client device and the invitee client device(s), wherein the link is configured to join a link caller into the synchronized video viewing.

15. The non-transitory computer-readable medium of claim 9, wherein the instructions are further effective to cause the at least one processor to:
send presence information for one or more objects, including a video object, wherein a user of the second client device can view information about a user that is accessing the one or more objects;

receive a request to begin the synchronized video viewing with the user accessing the video object;

send a prompt to the first client device of the user accessing the video object to confirm that they wish to join the synchronized video viewing; and initiate the synchronized video viewing with the first client device and the second client device.

16. The non-transitory computer-readable medium of claim 9, wherein the instructions are further effective to cause the at least one processor to:

while a second user device is accessing a video object, send an indication that at least one other user is also accessing the video object;

receive a request to begin the synchronized video viewing with the user accessing the video object;

send a prompt to the first client device of the user accessing the video object to confirm that they wish to join the synchronized video viewing; and initiate the synchronized video viewing with the first client device and the second client device.

17. A second client device comprising:

a processor; and a memory storing instructions that, when executed by the processor, configure the second client device to:

send a second collaboration message to a synchronized video viewing service configured to facilitate synchronized video viewing, wherein the synchronized video viewing service is configured to facilitate synchronized video viewing has also received one or more first collaboration messages from one or more first client devices participating in the synchronized video viewing with the second client device;

receive the one or more first collaboration messages and the second collaboration message from the synchronized video viewing service configured to facilitate synchronized video viewing, wherein the one or more first collaboration messages and the second collaboration message are received in an order received at the synchronized video viewing service configured to facilitate synchronized video viewing, wherein the one or more first collaboration messages are ordered prior to the second collaboration message, whereby the one or more first collaboration messages are received prior to the second collaboration message;

ignore the one or more first collaboration messages by the second client device; and process the second collaboration message by the second client device.

18. The second client device of claim 17, wherein the instructions further configure the second client device to:

associated with the sending of the second collaboration message, incrementing a pending changes count on the second client device;

while the pending changes count is greater than zero, ignore any collaboration messages originating from a device other than the second client device.

19. The second client device of claim 18, wherein the processing the second collaboration message comprises:

decrementing the pending changes count.

20. The second client device of claim 18, wherein the pending changes count is a logical clock.

* * * * *